(12) United States Patent
Sink

(10) Patent No.: US 7,746,794 B2
(45) Date of Patent: Jun. 29, 2010

(54) INTEGRATED MUNICIPAL MANAGEMENT CONSOLE

(75) Inventor: Gregory A. Sink, Frankfort, IL (US)

(73) Assignee: Federal Signal Corporation, Oak Brook, IL (US)

( * ) Notice: Subject to any disclaimer, the term of this patent is extended or adjusted under 35 U.S.C. 154(b) by 29 days.

(21) Appl. No.: 11/505,642

(22) Filed: Aug. 17, 2006

(65) Prior Publication Data

US 2007/0195706 A1 Aug. 23, 2007

Related U.S. Application Data

(60) Provisional application No. 60/775,634, filed on Feb. 22, 2006.

(51) Int. Cl.
| | |
|---|---|
| H04L 12/26 | (2006.01) |
| H04W 4/00 | (2009.01) |
| H04B 17/00 | (2006.01) |
| G06F 13/14 | (2006.01) |
| G06F 15/173 | (2006.01) |
| G08B 1/08 | (2006.01) |
| G08B 5/22 | (2006.01) |

(52) U.S. Cl. .................. 370/245; 370/338; 370/463; 340/506; 340/531; 340/539.25; 340/825.36; 345/520; 455/67.7; 709/223

(58) Field of Classification Search ............ 370/245, 370/338, 463; 340/506, 531, 539.25, 825.36; 345/520; 455/67.7; 709/223
See application file for complete search history.

(56) References Cited

U.S. PATENT DOCUMENTS

| | | | |
|---|---|---|---|
| 4,155,042 A * | 5/1979 | Permut et al. ............. 340/7.5 |
| 4,633,229 A | 12/1986 | Iacono et al. | |
| 4,722,030 A | 1/1988 | Bowden | |
| 4,789,904 A | 12/1988 | Peterson | |
| 5,185,697 A | 2/1993 | Jacobs et al. | |
| 5,487,069 A | 1/1996 | O'Sullivan et al. | |
| 5,539,398 A | 7/1996 | Hall et al. | |
| 5,572,201 A * | 11/1996 | Graham et al. ............. 340/902 |

(Continued)

FOREIGN PATENT DOCUMENTS

BE 1006768 A6 12/1994

(Continued)

OTHER PUBLICATIONS

"Emergency Alert & Notification Solutions for Government and Business", (Homeland Defense Training Conference), Homeland Defense Journal, Jun. 29, 2006.

(Continued)

*Primary Examiner*—Alpus H Hsu
(74) *Attorney, Agent, or Firm*—Leydig, Voit & Mayer, Ltd.

(57) ABSTRACT

Embodiments of the invention provide a networked system and management console for visualizing, identifying, and handling municipal or other regional events of interest as they arise. The management console is communicably linked via a wide area wireless network and/or other network or communications facilities to a number of data sources (e.g., contamination sensors) and management resources (e.g., alarms, traffic control devices, etc.). The management console provides, in embodiments of the invention, a simple and clear picture of the current health of a monitored area, such as a municipality, being, and provides an interface for responding to incoming data.

38 Claims, 15 Drawing Sheets

U.S. PATENT DOCUMENTS

| | | | |
|---|---|---|---|
| 5,602,739 A | 2/1997 | Haagenstad et al. | |
| 5,689,233 A | 11/1997 | Kurisu et al. | |
| 5,815,417 A | 9/1998 | Orr et al. | |
| 5,826,180 A | 10/1998 | Golan | |
| 5,861,959 A | 1/1999 | Barak | |
| 5,884,997 A | 3/1999 | Stanuch et al. | |
| 5,887,139 A * | 3/1999 | Madison et al. | 709/223 |
| 5,926,113 A | 7/1999 | Jones et al. | |
| 5,937,029 A | 8/1999 | Yosef | |
| 5,986,575 A | 11/1999 | Jones et al. | |
| 6,046,824 A | 4/2000 | Barak | |
| 6,081,191 A | 6/2000 | Green et al. | |
| 6,112,088 A * | 8/2000 | Haartsen | 455/437 |
| 6,149,288 A | 11/2000 | Huang | |
| 6,154,787 A * | 11/2000 | Urevig et al. | 710/8 |
| 6,161,066 A | 12/2000 | Wright et al. | |
| 6,167,036 A | 12/2000 | Beven | |
| 6,169,476 B1 | 1/2001 | Flanagan | |
| 6,188,939 B1 | 2/2001 | Morgan et al. | |
| 6,192,232 B1 | 2/2001 | Iseyama | |
| 6,243,026 B1 | 6/2001 | Jones et al. | |
| 6,249,812 B1 * | 6/2001 | Cromer et al. | 709/221 |
| 6,330,025 B1 | 12/2001 | Arazi et al. | |
| 6,411,874 B2 | 6/2002 | Morgan et al. | |
| 6,437,692 B1 | 8/2002 | Petite et al. | |
| 6,474,557 B2 | 11/2002 | Mullins et al. | |
| 6,542,602 B1 | 4/2003 | Elazar | |
| 6,564,342 B2 * | 5/2003 | Landan | 714/48 |
| 6,567,747 B1 | 5/2003 | Lange et al. | |
| 6,574,561 B2 | 6/2003 | Alexander et al. | |
| 6,624,750 B1 | 9/2003 | Marman et al. | |
| 6,641,284 B2 | 11/2003 | Stopa et al. | |
| 6,747,557 B1 | 6/2004 | Petite et al. | |
| 6,762,686 B1 | 7/2004 | Tabe | |
| 6,856,343 B2 | 2/2005 | Arazi et al. | |
| 6,868,340 B2 | 3/2005 | Alexander et al. | |
| 6,891,838 B1 | 5/2005 | Petite et al. | |
| 6,914,533 B2 | 7/2005 | Petite | |
| 6,930,596 B2 | 8/2005 | Kulesz et al. | |
| 6,942,360 B2 | 9/2005 | Chou et al. | |
| 6,959,079 B2 | 10/2005 | Elazar | |
| 6,966,682 B2 | 11/2005 | Frank et al. | |
| 6,976,769 B2 | 12/2005 | McCullough et al. | |
| 6,982,518 B2 | 1/2006 | Chou et al. | |
| 6,999,876 B2 | 2/2006 | Lambert et al. | |
| 7,010,106 B2 | 3/2006 | Gritzer et al. | |
| 7,010,109 B2 | 3/2006 | Gritzer et al. | |
| 7,015,806 B2 * | 3/2006 | Naidoo et al. | 340/531 |
| 7,016,478 B2 | 3/2006 | Potorny et al. | |
| 7,034,678 B2 | 4/2006 | Burkley et al. | |
| 7,044,616 B2 | 5/2006 | Shih | |
| 7,057,517 B1 | 6/2006 | Convery | |
| 7,058,710 B2 | 6/2006 | McCall et al. | |
| 7,065,445 B2 * | 6/2006 | Thayer et al. | 701/200 |
| 7,070,418 B1 | 7/2006 | Wang | |
| 7,080,544 B2 | 7/2006 | Stepanik et al. | |
| 7,091,852 B2 | 8/2006 | Mason et al. | |
| 7,103,511 B2 | 9/2006 | Petite | |
| 7,148,803 B2 | 12/2006 | Bandy et al. | |
| 7,158,026 B2 * | 1/2007 | Feldkamp et al. | 340/531 |
| 7,240,328 B2 | 7/2007 | Beckett et al. | |
| 7,250,853 B2 * | 7/2007 | Flynn | 340/506 |
| 7,281,818 B2 | 10/2007 | You et al. | |
| 7,295,128 B2 | 11/2007 | Petite | |
| 7,305,082 B2 | 12/2007 | Elazar et al. | |
| 7,319,397 B2 | 1/2008 | Chung et al. | |
| 7,333,445 B2 | 2/2008 | Ilan et al. | |
| 7,346,186 B2 | 3/2008 | Sharoni et al. | |
| 7,386,105 B2 | 6/2008 | Wasserblat et al. | |
| 7,391,299 B2 * | 6/2008 | Bender et al. | 340/292 |
| 7,474,633 B2 | 1/2009 | Halbraich et al. | |
| 7,476,013 B2 | 1/2009 | Gergets et al. | |
| 7,480,501 B2 | 1/2009 | Petite | |
| 7,526,322 B2 * | 4/2009 | Whistler | 455/566 |
| 2001/0024163 A1 | 9/2001 | Petite | |
| 2002/0019725 A1 | 2/2002 | Petite | |
| 2002/0024424 A1 | 2/2002 | Burns et al. | |
| 2002/0112026 A1 | 8/2002 | Fridman et al. | |
| 2002/0116242 A1 | 8/2002 | Vercellone et al. | |
| 2002/0181232 A1 | 12/2002 | Martineau | |
| 2003/0028536 A1 | 2/2003 | Singh et al. | |
| 2003/0061323 A1 * | 3/2003 | East et al. | 709/223 |
| 2003/0078029 A1 | 4/2003 | Petite | |
| 2003/0095688 A1 | 5/2003 | Kirmuss | |
| 2003/0141990 A1 | 7/2003 | Coon | |
| 2004/0044553 A1 | 3/2004 | Lambert et al. | |
| 2004/0049345 A1 | 3/2004 | McDonough et al. | |
| 2004/0057410 A1 | 3/2004 | Kaipiainen et al. | |
| 2004/0070515 A1 | 4/2004 | Burkley et al. | |
| 2004/0114391 A1 | 6/2004 | Watkins et al. | |
| 2004/0137768 A1 | 7/2004 | Haehn et al. | |
| 2004/0142678 A1 | 7/2004 | Krasner | |
| 2004/0145481 A1 | 7/2004 | Dilbeck et al. | |
| 2004/0189490 A1 | 9/2004 | Halishak | |
| 2004/0193740 A1 | 9/2004 | Kasmirsky et al. | |
| 2004/0246144 A1 | 12/2004 | Siegal et al. | |
| 2005/0001720 A1 | 1/2005 | Mason et al. | |
| 2005/0018622 A1 | 1/2005 | Halbraich et al. | |
| 2005/0034075 A1 | 2/2005 | Riegelman et al. | |
| 2005/0047167 A1 | 3/2005 | Pederson et al. | |
| 2005/0109394 A1 | 5/2005 | Anderson | |
| 2005/0123115 A1 | 6/2005 | Gritzer et al. | |
| 2005/0134283 A1 | 6/2005 | Potempa | |
| 2005/0151642 A1 | 7/2005 | Tupler et al. | |
| 2005/0174229 A1 | 8/2005 | Feldkamp et al. | |
| 2005/0176403 A1 * | 8/2005 | Lalos | 455/404.1 |
| 2005/0190055 A1 | 9/2005 | Petite | |
| 2005/0197871 A1 | 9/2005 | Mendonca et al. | |
| 2005/0201397 A1 | 9/2005 | Petite | |
| 2005/0219044 A1 | 10/2005 | Douglass et al. | |
| 2005/0239477 A1 | 10/2005 | Kim et al. | |
| 2005/0243867 A1 | 11/2005 | Petite | |
| 2005/0245232 A1 | 11/2005 | Jakober et al. | |
| 2005/0258942 A1 | 11/2005 | Manasseh et al. | |
| 2005/0275549 A1 | 12/2005 | Barclay et al. | |
| 2005/0282518 A1 | 12/2005 | D'Evelyn et al. | |
| 2006/0002372 A1 | 1/2006 | Smith | |
| 2006/0009190 A1 | 1/2006 | Laliberte | |
| 2006/0045185 A1 | 3/2006 | Kiryati et al. | |
| 2006/0059139 A1 | 3/2006 | Robinson | |
| 2006/0061997 A1 | 3/2006 | Lin | |
| 2006/0068752 A1 | 3/2006 | Lin et al. | |
| 2006/0071775 A1 | 4/2006 | Otto et al. | |
| 2006/0092043 A1 | 5/2006 | Lagassey | |
| 2006/0109113 A1 | 5/2006 | Reyes et al. | |
| 2006/0114853 A1 | 6/2006 | Hasty, Jr. et al. | |
| 2006/0133624 A1 | 6/2006 | Wasserblat et al. | |
| 2006/0136597 A1 | 6/2006 | Shabtai et al. | |
| 2006/0146740 A1 | 7/2006 | Sheynman et al. | |
| 2006/0158329 A1 | 7/2006 | Burkley et al. | |
| 2006/0179064 A1 | 8/2006 | Paz et al. | |
| 2006/0187015 A1 | 8/2006 | Canfield | |
| 2006/0190576 A1 * | 8/2006 | Lee et al. | 709/223 |
| 2006/0227719 A1 | 10/2006 | Halbraich | |
| 2006/0268847 A1 | 11/2006 | Halbraich et al. | |
| 2006/0285665 A1 | 12/2006 | Wasserblat et al. | |
| 2007/0008174 A1 | 1/2007 | Schwartz | |
| 2007/0035962 A1 | 2/2007 | Yurochko | |
| 2007/0041220 A1 | 2/2007 | Lynch | |
| 2007/0122003 A1 | 5/2007 | Dobkin et al. | |
| 2007/0194906 A1 | 8/2007 | Sink | |
| 2007/0195939 A1 | 8/2007 | Sink | |
| 2007/0211866 A1 | 9/2007 | Sink | |
| 2007/0213088 A1 | 9/2007 | Sink | |

| | | | |
|---|---|---|---|
| 2007/0218910 | A1 | 9/2007 | Hill et al. |
| 2007/0242472 | A1 | 10/2007 | Gergets et al. |
| 2007/0250318 | A1 | 10/2007 | Wasserblat et al. |
| 2008/0036583 | A1 | 2/2008 | Canfield |
| 2008/0040110 | A1 | 2/2008 | Pereg et al. |
| 2008/0066184 | A1 | 3/2008 | Ben-Ami et al. |
| 2008/0144528 | A1 | 6/2008 | Graves et al. |
| 2008/0148397 | A1 | 6/2008 | Litvin et al. |
| 2008/0152122 | A1 | 6/2008 | Idan et al. |
| 2008/0154609 | A1 | 6/2008 | Wasserblat et al. |
| 2008/0181417 | A1 | 7/2008 | Pereg et al. |
| 2008/0189171 | A1 | 8/2008 | Wasserblat et al. |
| 2008/0195385 | A1 | 8/2008 | Pereg et al. |
| 2008/0195387 | A1 | 8/2008 | Zigel et al. |
| 2008/0228296 | A1 | 9/2008 | Eilam et al. |
| 2009/0007263 | A1 | 1/2009 | Frenkel et al. |
| 2009/0012826 | A1 | 1/2009 | Eilam et al. |
| 2009/0033745 | A1 | 2/2009 | Yeredor et al. |
| 2009/0043573 | A1 | 2/2009 | Weinberg et al. |

FOREIGN PATENT DOCUMENTS

| | | |
|---|---|---|
| CA | 2426243 A1 | 10/2003 |
| WO | WO 00/06420 | 2/2000 |
| WO | WO 00/26420 A1 | 2/2000 |
| WO | WO 0021053 | 4/2000 |
| WO | WO 00/55825 | 9/2000 |
| WO | WO 03/023729 A1 | 3/2003 |
| WO | WO 03/067884 A1 | 8/2003 |
| WO | WO 2004/010398 | 1/2004 |
| WO | WO 2004/038594 | 5/2004 |

OTHER PUBLICATIONS

"Executive Order: Public Alert and Warning System" (Press Release) Jun. 26, 2006.

"Senate Approves Nominees for NTIC, NTSB, Saint Lawrence, Seaway, NOAA and USG", United States Senate Committee on Commerce Science and Transportation, Dec. 11, 2006.

"Weather Hazards Assessment", United States Department of Commerce, National Oceanic and Atmospheric Administration, Dec. 28, 2006.

Article entitled "Crist praises work of first responders", article from Ocala Star Banner (Feb. 7, 2006).

Brochure for "*Whelen Edge LFL Liberty Linear—Led—Light Bars*", Form# LIB0506, 2006.

Brochure for Code 3 Public Safety Equipment, Inc., "*LED X™ 2100 Light Bar*", Installation Operation Manual, Jun. 2002.

Federal Signal Corporation Brochure for "*Arjent S2 LED Light Bar*", bulletin #3185, version 306, 4 pages, 2006.

Federal Signal Corporation Brochure for "*Arjent SL LED Bar*", bulletin M1005, version 406, 2 pages, 2007.

Federal Signal Corporation Brochure for "*Legend Light Bar*", As Brilliant Inside as it is Outside, #3190, 3 pages, 2007.

Federal Signal Corporation Brochure for "*Raydian S2 Light Bar*", Bright New Thinking, Preliminary Draft, #m1037, 2 pages, 2007.

Federal Signal Corporation Brochure for "*Raydian SL Light Bar*", bulletin #M1035, version 906, 4 pages, 2006.

Photo of Arjent S2 Federal Signal Light Bar.

Photo of Code3 Lightbar (Model No. LEDX2100).

Photo of Whelen Lightbar (Model No. SX8BBBB LFL Liberty).

Power Point Presentation entitled "*Arjent S2/Legend Product Introduction*", by Paul Gergets presented during a telephone interview on May 10, 2007, 25 slides.

Morris, Tom, "IRC's Anotherm™ Boards Eliminate Heatsinks for Automotive LED Applications", TT electronics, Jun. 17, 2003 (2 page).

Article entitled: "Surface Mount LEDs: The Winding Road to Today's Solutions", *Dialight, The Worldwide Leader in LED Technology*, Copyright 2005 (4 pages).

Morris, Tom, "Aluminum Substrates Make Light Work of Visible LED Circuits", *Canadian Electronics Buyer's Guide*, Mar. 3, 2006 (2 pages).

News Release entitled: "Substrate Solves Power LED Thermal Problems", *TT Electronics Welwyn Components*, Apr. 15, 2004 (2 page).

Product News entitled: "Aluminum Substrate PCBs eliminate heatsinks in automotive LED Lighting", *Reed Electronics Group*, May 2004 (1 page).

Morris, Tom, "IRC's Anotherm™ Technology Enables LEDs to Operate at Full Power", *TT electronics*, Feb. 15, 2006, ( 3 page).

Siuru, William, "Police Cars go High-Tech" *Popular Electronics*, 11, 59-62 (Aug. 1994).

Boomer, Rachel "Test Car Has Perks, Lacks Basics," *Halifax Daily News, Weekly Edition*, B7 (Nov. 12, 1997).

"Guide Lightbar Guidance Added to Case IH Line," *Successful Farming*, 101(2), 40A, (Feb. 1, 2003).

Storey, Denis "IWCE 2003 Preview" *Mobile Radio Technology*, 21(2) (Feb. 1, 2003).

"IWCE—Cimarron Technologies" *Mobile Radio Technology*, 21(3) (Mar. 1, 2003).

Dees, Tim "The Patrol Video Project," *Law & Order*, 52(7), 92 (Jul. 1, 2004).

"Cisco 3200 Series Wireless and Mobile Router—2.4-GHz and 4.9-GHz Antenna Guide" product reference, Cisco Systems Inc. (© 2005).

Snap shot retrieved from http://www.remingtonelsag.com—Remington ELSAG Law Enforcement Systems, Mobile Plate Hunter.

Ethan WAN Systems Product page regarding "TS900/TS930 Series", unknown date retrieved from http://www.etherwan.com/products.aspx?categoryID=246 on Oct. 11, 2006.

Data Sheet entitled "Axis 211/211A Network Cameras-Superior video quality for professional indoor and outdoor applications", AXIS Communications (2006).

Data Sheet entitled "Transforming SCADA as you know it", TERRA Intelligent RTU, Federal Signal Controls, (2006).

Product page entitled "GPS Vehicle Tracking Units: Shadow Tracker™ 2000", retrieved from http://www.onetrackinc.com/Shadow-Tracker-2000.htm on Oct. 10, 2006.

Product page entitled "AutoFind-Mobile License Plate Recognition (LPR)", Auto Vu Technologies, retrieved from http://www.autovu.com/website/content/products_autofind.html.

Article entitled "*Fight Crime Without Wires: Colorado City's Wireless Network Uses GPRS and Wi-Fi to get Information to Public-Safety Workers Faster*", The Gale Group, Information Week, (Feb. 9, 2004).

Enriquez, Darryl, "*Wireless System Appeals to Panel: Idea Now Goes to Waukesha Council*", KRTBN Knight-Rider Tribune Business News—The Milwaukee Journal, (Feb. 16, 2006).

Douglas, Merrill, "*Bringing CAD Into the Field*", Mobile Radio Technology, vol. 22, No. 11, p. 36, (Nov. 1, 2004).

Champaign Security System LLC., "The VideoSNITCH Street Sentinel", (2 pages).

Champaign Security System LLC., VideoSNITCH announcement (1 page, Jun. 28, 2004).

Champaign Security Systems, the VideoSNITCH (2 pages, Feb. 8, 2007).

SWAP900, Solar Wireless Access Point, iRDATA Corporation, (2 pages, 2006).

Calem, Robert E., "Battle of the Networking Stars: Part One—ZigBee and Z-Wave wireless technologies fight for the home", *Digital Connect Magazine*, 2005, n 008, p. 35.

Paillard, Cedric "Chips square off on Zigbee", *Electronic Engineering Times*, 2005, n 1365, p. 66.

Bulk, Frank, Update: Wireless Lan Battle Plan—"We pitted four top products against one another in a second WLAN competition. As in the first contest, Airespace's entry earned our Editor's Choice award", *Network Computing*, 2005, n 1603, p. 51.

DeMaria, Michael J., Last Line of Defense—Perimeter Security Is Failing Us. Look to a Host-Based Approach to Protect Your Enterprise From Strikes Against Multiple Fronts *Network Computing*, 2004, n 1508, p. 38.

DeMaria, Michael J., "Home Smart Home", *Network Computing*, 2002, n 1301, p. 55.

Yoshida, Junko, "Buzz surrounds ZigBee as pervasive wireless spec", *Electronic Engineering Times*, 2001, n 1192, p. 16.

Curran, Lawrence, "Embedded MCUs/MPUs Weather the Storm—Embedded Processors Are Finding More Diverse Applications, With 32-Bit Devices Building Steam", *EBM*, 2001, n 1257, p. 55.

Krochmal, Mo, "You Lead, They Will Follow: Footprints paints a digital map of consumers' trails—New IBM Technology Follows Retail Customers' Footsteps", *Computer Reseller News*, 2000, n 880, p. 69.

Medford, Cassimir, "Changing Fortunes—Vendors Gauge Their Integrator Relationships (Systems/ Network Integration)" Varbusiness, 1993, n 905 , 91.

Geoffrey, James, "The future that never was: seven products that could have changed the industry but didn't", *Electronic Business*, 31, 12, 46(6) Dec. 2005.

Cravotta, Robert, "Charting your course: follow the silicon-breadcrumb trail in this directory to find the perfect device for your project. (*The 32nd Annual Microprocessor Directory*) (Cover Story)", *EDN*, 50, 16, 57(11) Aug. 4, 2005.

Grimes, Brad, "With wireless, it's good to learn from others: agency initiatives offer valuable lessons about technology and security.(technology use by Army)" Government Computer News, 24, 20, 34(1) Jul. 25, 2005.

"Spotwave to Launch,Home Indoor Wireless Coverage.(launch of wireless communications equipment by Spotwave Wireless Inc.)", *eWeek*, NA Mar. 14, 2005.

Bulk, Frank—Update: "Wireless Lan Battle Plan—We pitted four top products against one another in a second WLAN competition. As in the first contest, Airespace's entry earned our Editor's Choice award", *Network Computing*, 51 Feb. 17, 2005.

Margulius, David L., "IPv6 marches forward—The next-generation Internet Protocol could spark a new generation of embedded and mobile network applications", *InfoWorld*, 26, 50, 8—Dec. 13, 2004.

Rash, Wayne, Security Adviser: Your security tune-up—It's 2003 and already it's time to review existing policies and perform vital status checks, *InfoWorld*, 25, 3, 26 Jan. 20, 2003.

Amato, Ivan, "Big Brother Logs On.(increasing surveillance and lack of privacy increases)", *Technology Review* (Cambridge, Mass.), 104, 7, 59 Sep. 2001.

Krochmal, Mo, "You Lead, They Will Follow: Footprints paints a digital map of consumers' trails—New IBM Technology Follows Retail Customers' Footsteps. (Company Business and Marketing)", *Computer Reseller News*, 69 Feb. 7, 2000.

Lammers, David, "Network-ready home appliances blanket show(intelligent deices linked over networks featured at International Housewares 2000 Tradeshow)(Company Business and Marketing)", *Electronic Engineering Times*, 24, Jan. 24, 2000.

Jones, Timothy, "Healthcare Roundup (Buyers Guide)", *Teleconnect*, 7, 2, 49(1) Feb. 1999.

Dodge, John, "Hidden VPN Security Costs Are Worth the Price. (Virtual private networks) (Technology Information)" *PC Week*, v15, n29, pN29(1)—Jul. 20, 1998.

Davis, Stan, "What's your emotional bandwidth? (keeping people's attention in the computer age)(Forbes @ 80) (Industry Trend or Event)", *Forbes*, v159, n14, p233(1) Jul. 7, 1997.

"Wireless: Ortel issued 3 patents for Series 5800 fiberoptics; advanced technology for in-building cellular coverage. (Industry Legal Issue) *Edge", on & about AT&T*, v10, n379, p. 11(1)—Oct 30, 1995.

"GSM: Ortel announces GSM & DCS1800 versions of series 5800 for in-building cellular coverage using fiberoptic technology; allows cellular operators to maintain competitive edge by enabling new services & expanding coverage areas", *Edge, on & about AT&T*, v10, n376, p. 39(1)—Oct 9, 1995.

"PCS: Ortel announces PCS version of revolutionary Series 5800 Fiberoptic Antennas to provide in-building PCS coverage. New application of fiber-optic technology allows PCS operators to compete with the cellular industry (Personal Communications Network)", *Edge, on & about AT&T*, v10, n374, p. 24(1)—Sep. 25, 1995.

"Wireless world: Ortel announces cutting-edge Series 5800 for in-building cellular coverage using fiber-optic technology. (Product Announcement)", *Edge, on & about AT&T*, v10, n341, p. 29(1)—Feb. 6, 1995.

Brambert, Dave, "Get board easily? The newest board game: getting market ownership by owning silicon. (Channel News)", *LAN Magazine*, v8, n13, p. 240(2)—Dec. 1993.

Feit, Edward, "Computer-linked pager improves security, saves Morton money. (Morton International Inc.)", *Communications News*, v30, n4, p. 24(1) Apr., 1993.

Baron, David et al., "Radio Data Broadcast System debuts. (News from CES and MacWorld) (Brief Article)" *Digital Media*, v2, n8, p. 19(1)—Jan 18, 1993.

Cox, John , "Switches simplify WLAN deployment", *Journal: Network World*, p. 1, Publication Date: Apr. 14, 2003.

Johnson, Maryfran, "The 12 Beeps of Xmas", *Journal: Computerworld*, p. 20, Publication Date: Dec. 23, 2002.

Briefs -Journal: *Computerworld*, p. 56, Publication Date: Sep. 30, 1996.

Wexler, Joanie M., "Mobile users just a beep away Start-up's WinBeep to extend reach of Motorola's Alert Central", *Journal: Computerworld*, p. 51, Publication Date: Feb. 22, 1992.

Eckerson, Wayne, "Revolution in the air Wireless options shaking up the voice system market", Journal: *Network World*, p. 68, Publication Date: Jun. 15, 1992.

"Senate Govt. Affairs Committee ranking Democrat", *Communications Daily* Jul. 6, 2004 Document Type: Newsletter.

Ziembicki, M., et al., "Hardware random number generator designed for cryptographic systems", Journal: *Kwartalnik Elektroniki i Telekomunikacji* , vol. 49, No. 4, p. 503-14 Publisher: Polish Scientific Publishers PWN, Publication Date: 2003 Country of Publication: Poland.

Hudgins-Bonafield, Christy, et al., "Where There's Smoke . . . ", *Network Computing*, 1996, n 718, p. 22.

Antelman, Leonard, "Mixed-signal ICs getting hotter", *Electronic Buyers' News*, 1992, n 796, PE20.

Latest cabling and wiring products.(News Briefs), *Communications News*, 37, 6, 44 Jun. 2000.

Rigney, Steve, "The network smoke detector . (Kaspia Automated Network Monitoring System 1.1)(Network Edition First Looks) (Software Review)(Evaluation)" *PC Magazine*, v16, n7, p. NE19(1) Apr. 8, 1997.

"Network diagnostics: LANQuest announces InterView, the first browser-based proactive network diagnostic center.(Product Announcement)", *Edge: Work-Group Computing Report*, v8, p. 28(1)—Feb. 3, 1997.

Zyskowski, John, "Controlling current events: choosing an uninterruptible power supply or line protector. (includes related articles on UPS add-ons, shutdown software and simple network management protocol) (Buyers Guide)", *Computer Shopper*, v16, n4, p. 302(15)—Apr. 1996.

Cohodas, Marilyn J., "Rescue plan. (Federal Emergency Management Agency) (PC Week Executive) (includes related articles on cost savings, walking away from potential disasters)", *PC Week*, v12, n21, p. E1(2)—May 29, 1995.

Schurr, Amy, "Protection from infection; anti-virus software is a necessary safeguard for networked, stand-alone PCs, say corporate buyers. (includes related set of tips for avoiding virus-related problems) (PC Week Netweek)", *PC Week*, v11, n42, p. N3(1) Oct. 24, 1994.

Abel, Amee Eisenberg, "World Trade Center bombing underscores need for data-loss prevention. (Brief Article)", *Computer Shopper*, v13, n7, p. 72(1)—Jul. 1993.

Rossheim, John, "Handwriting-recognition features can make or break pen computing. (Mobile Computing: PC Week Supplement)", *PC Week*, v10, n15, p. S15(1)—Apr. 19, 1993.

Jacobs, Paula, "How critical is mission-critical? (prioritizing applications and users according to business needs and systems costs) (Enterprise Computing)", *HP Professional*, v7, n3, p. 36(3)—Mar. 1993.

"New for networks: NetAlarm 2.0 network monitoring. (Meyers and Associates) (Product Announcement)", Newsbytes, pNEW08060022—Aug. 6, 1991.

Cox, John, "Start-up offers high-capacity WLAN gear", *Journal: Network World*, p. 17, Publication Date: Mar. 28, 2005.

Patch, Kimberly, et al., "Invasion of the embedded systems", *Journal: Network World* p. 1, Publication Date: Jun. 8, 1998.

Dryden, Patrick, "Kaspia automated network management suite gives an early warning of problems", *Journal: Computerworld*, p. 61, Publication Date: Sep. 9, 1996.

Gibbs, Mark, "Bad times are just around the corner Net Results", *Journal: Network World*, p. 22, Publication Date: Feb. 21, 1994.

"Airline Alcohol Restriction Unlikely to Generate Sufficient Support Satellite Today" Jul. 20, 2001 vol. 4 Issue: 138 Document Type: Newsletter.

Results of Google Search performed.

Abstract from Dialog of the article for: Atjoi, et al., *Proceedings 9th IEEE International Workshop on Robot and Human Interactive Communication.* IEEE Ro-Man 2000 (Cat. No.00TH8499) 96-100 (2000).

Abstract from Dialog of the article for: Atjoi, et al., *Transactions of the Institute of Electrical Engineers of Japan, Part C*, 122-C(10) 1846-1855 (Oct. 2002).

Abstract from Dialog of the article for: Atjoi, et al., *Electrical Engineering in Japan*, 147(1), 60-69 (Apr. 15, 2004).

Abstract from Dialog of the article for: Bruzewicz, A.J., "Remote Sensing and GIS for Emergency Management" *Proceedings of the First Federal Geographic Technology Conference, Exposition and DataMart* (Sep. 26-28, 1994).

Full Text Article from Dialog entitled: "Department of Energy Improves Emergency Communications Management With SeNTinel WebEOC From CML Emergency Services Inc." *PR Newswire*, p. 5836 (Aug. 3, 2000).

Abstract from Dialog of the article for: Dong, Pinlian, "Development of a GIS/GPS-based Emergency Response System", *Geomatica*, 59(4), 427-433 (2005).

Abstract from Dialog of the article for: Gadomski, et al, "An Approach to the Intelligent Decision Advisor (IDA) for Emergency Managers" $6^{th}$ *Annual Conference of the International Emergency Management Society* (1999).

Abstract from Dialog of the article for: Gadomski, et al., "Towards Intelllignet Decision Support Systems for Emergency Managers: the IDS approach", *International J. of Risk Assessment & Management*, 2(3-4), 224-242 (2001).

Full Text Article from Dialog entitled: "Globalstar Develops Wireless Emergency Management Communications System for Disaster Response" *PR Newswire* (Oct. 6, 2005).

Abstract from Dialog of the article for: Gross, "The Design and Management of an International Disaster Information Resource Network (Binding an Emergency Lane on the Information Superhighway)," *The International Emergency Management and Engineering Conference 1995* (May 9-12, 1995).

Abstract from Dialog of the article for: Hamit, "Out from R and D: A Net-based Command and Control Virtual Community for Emergency Management", *Advanced Imaging*, 13(2), 81-82 (Feb. 1998).

Full Text Article from Dialog entitled: "Homeland Security Official Seeks Coherent Wireless Strategy" *Communications Daily* (Dec. 11, 2002).

Abstract from Dialog of the article for: Laben, "Integration of Remote Sensing Data and Geographic Information System Technology for Emergency Managers and Their Applications at the Pacific Disaster Center", *Optical Engineering*, 41(9), 2129-2136 (Sep. 2002).

Full Text Article from Dialog entitled: Morrissey, et al., Red Cross to Use Portable LANs to Coordinate Disaster Relief *PC Week*, 5(5), C1 (Feb. 2, 1988).

Full Text Article from Dialog entitled: "National Center for missing & Exploited Children Joins Forces with Nextel, Comlabs, and the Pennsylvania State Police to Develop New Wireless Amber Alert Service" *Business Wire* (Jul. 12, 2004).

Full Text Article from Dialog entitled: NexGen City™, Public Safety Wireless Network Provider, Deploys SPECTRUM® INFINITY™; Aprisma Solution Ensures Availability of Data, Voice and Video fro NexGen City's Wireless First Responder Network, *PR Newswire* (Jul. 12, 2004).

Full Text Article from Dialog entitled: "XM Radio and Weather Works to Launch Breakthrough Real-Time Weather Data Service for Aviation, Marine and Emergency Management; Garmin and Heads Up Technologies to Provide State-of-the-Art Receivers" *PR Newswire* (Apr. 7, 2003).

"WLAN Solutions: TNETW1100B Embedded Single-Chip Mac and Baseband Processor" Texas Instruments Product Bulletin (© 2002).

"Wireless LAN in Public Safety, 802.11b: Transforming the Way Public Safety Agencies Transfer Information," Brochure, www.northropgrummanIT.com, Northrop Grumman Information Technology (© 2003).

"Wireless LAN Infrastructure Mesh Networks: Capabilities and Benefits" *A Farpoint Group White Paper*, Document No. FPG 2004-185.1 Farpoint Group (Jul. 2004).

"Public Safety: 4.9 GHz Wireless Mesh Networks for Public Safety and First Responders," Firetide Inc., www.firetide.com (© 2004-2005).

Miller, Leonard E. "Wireless Technologies and the SAFECOM SoR for Public Safety Communications" *Wireless Communication Technologies Group, Advanced Network Technologies Division, Information Technology Laboratory, National Institute of Standards and Technology*, Gaithersburg, Maryland, pp. 1-68 (2005).

"Hot Port™ 4.9 GHz Public Safety Mesh Network" brochure, Firetide Inc., www.firetide.com (© 2005).

"An Introduction to Wireless Mesh Networking", *White Paper*, Firetide, Inc,. www.firetide.com, pp. 1-18 (Mar. 2005).

Wolff, Robert "Better Communication Through MESH Technology" *Bourbonnais Harold* (Apr. 4, 2006).

Siemens Building Technologies "MM 8000: Simple and Secure Danger Management" Siemens Switzerland, Ltd. (Jun. 2005).

Gralla, Preston, "How Wireless Works", Second Edition, Only Part 4, Chapters 14, 15, 16, 17, 18 and 19, (© 2006).

Wiggins, Roberta "Myths and Realities of Wi-Fi Mesh Networking" Yankee Group Report, Yankee Group Research, Inc. (Feb. 2006).

SYS Technologies (SYS) Corporate Fact Sheet, Jun. 30, 2006.

Imel, Kathy J., et al., "Understanding wireless Communications in Public Safety", A Guidebook to Technology, Issues, Planning , and Management, First Edition: Mar. 2000; Revised: Aug. 2000; Second Edition: Jan. 2003.

Gilsinn, James, D., et al., "Wireless Interfaces for IEEE 1451 Sensor Networks", Slon '01 Sensors for Industry Conference, Rosemont, IL (Nov. 5-7, 2001).

Roff, Graham, IEEE 1451 Overview "A Smart Transducer Interface for Sensors and Actuators" (May 13, 2004).

Success Story: Chicago Police Department, Chicago Police-Video Surveillance, Wave, Wireless Corporation, www.wavewireless.com (page downloaded Apr. 2006).

Van Dyck, Robert E. and Miller, Leonard E. "Distributed Sensor Processing Over an Ad Hoc Wireless Network: Simulation Framework and Performance Criteria," Wireless Communications Technologies Group; National Institute of Standards and Technology (2001).

Miller, Leonard E. "Wireless Technologies and the SAFECOM SoR for Public Safety Communications" (2005).

Chevallay, C., et al., "Self-Organization Protocols for Wireless Sensor Networks," 2002 Conference on Information Sciences and Systems, Princeton University (Mar. 20-22, 2002).

Van Dyck, Robert E. "Detection Performance in Self-Organized Wireless Sensor Networks," National Institutes of Standards and Technology (Jun.-Jul. 2002).

Conner, Margery "Wireless-Sensor Networks: Find a Fit in the Unlicensed Band," (Mar. 16, 2006).

Knuth, Dean "Wireless LAN Technology in Public Safety," Northrop Grumman Mission Systems (Jun. 2004).

Project MESA: an Update, "Making Progress Toward an International PPDR Standard" pp. 1-7 (Sep. 2003).

"Multi Layered Security Framework for Metro-Scale Wi-Fi Networks", A Security White Paper (Feb. 2005).

"Metro-Scale Mesh Networking with Tropos MetroMesh™ Architecture", A Technology Whitepaper (Feb. 2005).

"Public Safety and Public Access: Granbury, Texas & Frontier Broadband", A Tropos Networks Case Study (Nov. 2005).

"Price-Performance Comparison: 3G and Tropos MetroMesh Architecture", A Technology Whitepaper (Apr. 2004).

"Understanding Wi-Fi and WiMAX as Metro-Access Solutions", White Paper, Wi-Fi and WiMax Solutions, (2004).

Audeh, Malik, "Metropolitan Scale Wi-Fi Networks", IEEE Computer, pp. 119-121 (Dec. 2004).

Lewis, Richard C., "Rhode Island Ready to Launch Statewide Wireless Network" Technology News (Apr. 28, 2006).

"Broadband Public Safety Data Networks in the 4.9 GHz Band: Potential, Pitfalls & Promise", *A Technology Whitepaper* (Mar. 2004).

"PCS: Ortel announces PCS version of revolutionary Series 5800 Fiberoptic Antennas to provide in-building PCS coverage. New application of fiber-optic technology allows PCS operators to compete with the cellular industry (Personal Communications Network)," Edge, on & about AT&T, v10, n374, p. 24(1)—Sep. 25, 1995.

Cox, John, "Start-up offers high-capacity WLAN gear," Journal: Network World, p. 1, Publication Date: Jun. 8, 1998.

Morris, Tom, "IRC's Anotherm™ PC Boards Eliminate Heatsinks for Automotive LED Applications," *TT electronics*, Jun. 17, 2003 (2 pages).

Press Release "*Nice Systems Launches Three New NiceVision Digital Video and Audio Recording Solutions*," retrieved from http:www.nice.com/news/show_pr.oho/id=170 on Apr. 1, 2009 (2 pages).

Product page entitled "*About Nice Vision*" retrieved from http:www.nice.com/products/video/nicevision_about.php on Apr. 1, 2009 (2 pages).

Letter dated Aug. 14, 2007 to Bryan Boettger from the County of Los Angeles Sheriff's Department Headquarters regarding Arjent S2 Light Bars.

CADVoice® Fire Station Controls: Visual Indicators and Automated Control of Lights, Doors, and More, retrieved from http://locution.com/products/cadvoice_firestation.htm on Jan. 15, 2007.

Highlighted Features and Benefits, :"Fire Station Alerting" retrieved from http://comtechcom.net/fireestationalerting/model10_fire_station_alert on Jan. 15, 2007.

Stallings, William, "Data and Computer Communications", Macmillian Publishing Company, New York, Collier Macmillan Publishers, London, total pp. 604 Copyright 1995.

Fire Station Alerting & Controls, Firefigher Health and Safety, retrieved from http//firestationalerting,com/index.pjp?module=ContentExpress on Jan. 15, 2007.

\* cited by examiner

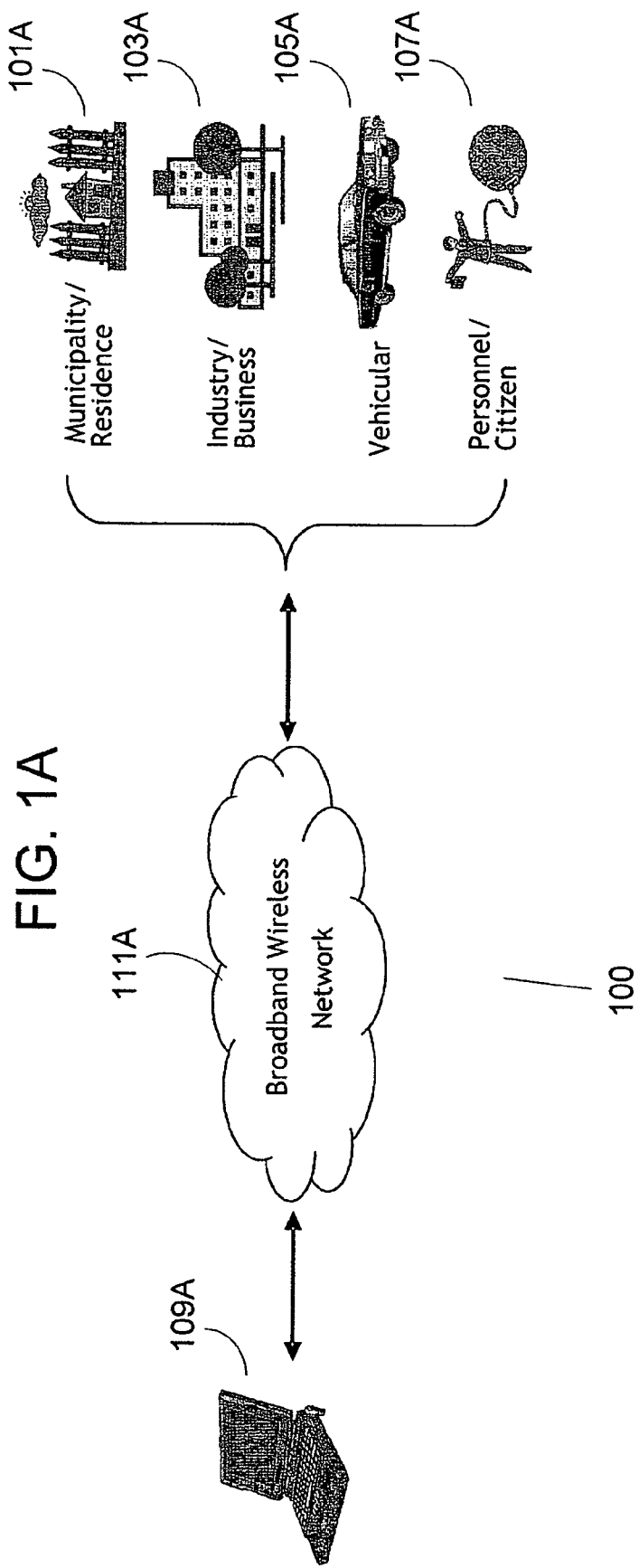

INTEGRATED MUNICIPAL MANAGEMENT CONSOLE

CROSS-REFERENCE TO RELATED APPLICATIONS

This patent application claims the benefit of U.S. Provisional Patent Application No. 60/775,634 filed Feb. 22, 2006.

BACKGROUND OF THE INVENTION

In today's society, the number and quality of municipal, business and personal resources and data sources has expanded far beyond the ability to adequately manage these assets. A typical city, for example, now has an infrastructure that includes municipal and residence facilities, industry and business infrastructure, vehicular resources and data sources, and personnel and citizen data sources and resources. While this vast array of facilities, services, and resources presents many opportunities and challenges, there is no mechanism currently available to access the untapped opportunities or satisfy the unmet challenges.

For example, as will be appreciated from the following description of embodiments of the invention, unified access to hazard notification, municipal resources, and citizen warning mechanisms presents rich opportunities to generate and manage a customized response to events, but there is no available infrastructure to quickly, effectively and intuitively assimilate the available information and understand the status of the necessary resources. As will be appreciated from the following description, in addition to recognizing the opportunities and problems inherent in the current situation, the present invention provides a means for accessing those opportunities and remedying those problems via a unique resource and information management system and console.

BRIEF SUMMARY OF THE INVENTION

Embodiments of the invention provide a management system and console for visualizing, identifying, and handling municipal events and resources. In an embodiment of the invention, the management console is communicably linked via a wide area wireless network or other network to other portions of the management system, including a number of data sources, e.g., contamination sensors, DMV records, etc., and management resources, e.g., alarms, notifications, traffic control devices, etc.

The management console provides, in embodiments of the invention, a simple and clear picture of the current health of a monitored area, such as a municipality. It also provides an interface for responding to an identified event, e.g., a severe weather event or a fire, such as by activating alarm signals, notifying appropriate municipal departments, personnel, and/or services, etc. In an embodiment of the invention, the management console is multilayered, in that at least a portion of the information displayed is a high level representation of one or more subsets of regions and/or resources of interest. In an embodiment of the invention, such additional areas can act as both a source of data and as a source of additional management resources.

In an embodiment of the invention, the management console includes a prioritized video representation of one or more areas of current interest. For example, within this embodiment of the invention, a bottom portion of the management console displays any available video feed that is relevant to an ongoing event of interest. Thus, for example, if sensors have detected a shot fired, the video display portion of the management console will display video from the cameras located closest to the shooting.

According to a further aspect of the invention, an array of locatable sensors having at least outgoing communication capabilities is provided and an array of addressable warning devices having at least incoming communication capabilities is provided. These sensors and devices are linked via a communications network such as a wireless network through a management console. In operation, incoming sensor data from the array of locatable sensors is processed by the management console to generate a localized warning signal to be emitted via the addressable warning devices.

The management console and system according to various embodiments of the invention incorporate other features and advantages that will be more fully appreciated from the following description in conjunction with the accompanying figures.

BRIEF DESCRIPTION OF THE SEVERAL VIEWS OF THE DRAWINGS

FIG. 1A is a schematic illustration showing a number of types of networked components and resources accessible in embodiments of the invention via the management console;

DETAILED DESCRIPTION OF THE INVENTION

The following description is intended to convey the operation of exemplary embodiments of the invention to those skilled in the art. It will be appreciated that this description is intended to aid the reader, not to limit the invention. As such, references to a feature or aspect of the invention are intended to describe a feature or aspect of an embodiment of the invention, not to imply that every embodiment of the invention must have the described characteristic.

Embodiments of the invention provide a management console to allow municipal management personnel to quickly understand the status of relevant events and resources and to manage resources or take appropriate actions. For example, in one embodiment of the invention, the management console allows the assimilation of seemingly unrelated data to identify dangers that might otherwise be unappreciated and to facilitate a more effective response than might otherwise be possible.

As noted above, the management system 100 according to embodiments of the invention connects locatable data sources (i.e., data sources whose locations are known at the degree of granularity of a town or city or portion thereof) and management resources to the management console. The data sources and management resources shown in FIG. 1A include components related to municipal facilities and residential structures 101A, industry and business infrastructure 103A, vehicular resources and data sources 105A, and personnel and citizen data sources and resources 107A.

As can be seen, the various data sources and management resources 101A, 103A, 105A, 107A of the system 100 are communicably linked to the management console 109A via one or more network connections 111A. The management console 109A is thus centralized relative to the data sources and resources. The network connections 111A need not be of any particular type or extent, although in an embodiment of the invention the network connections 111A comprise a wireless broadband network. In other embodiments of the invention, the network connections 111A comprise a single network or a conglomeration of networks, and comprise one or more connections that are wired and/or wireless. In an embodiment of the invention, the network 111A includes the Internet. Although the term "network" is used, that should not be taken to exclude non-digital communication media, and in an embodiment of the invention, the network connections 111A comprise at least in part a portion of the public switched telephone network (PSTN) or other voice communication medium. Thus, embodiments of the invention may utilize wireless, wired, broadband, LAN, Internet, TI and PSTN networking links, as well as other types of networking media.

Figure 1B:
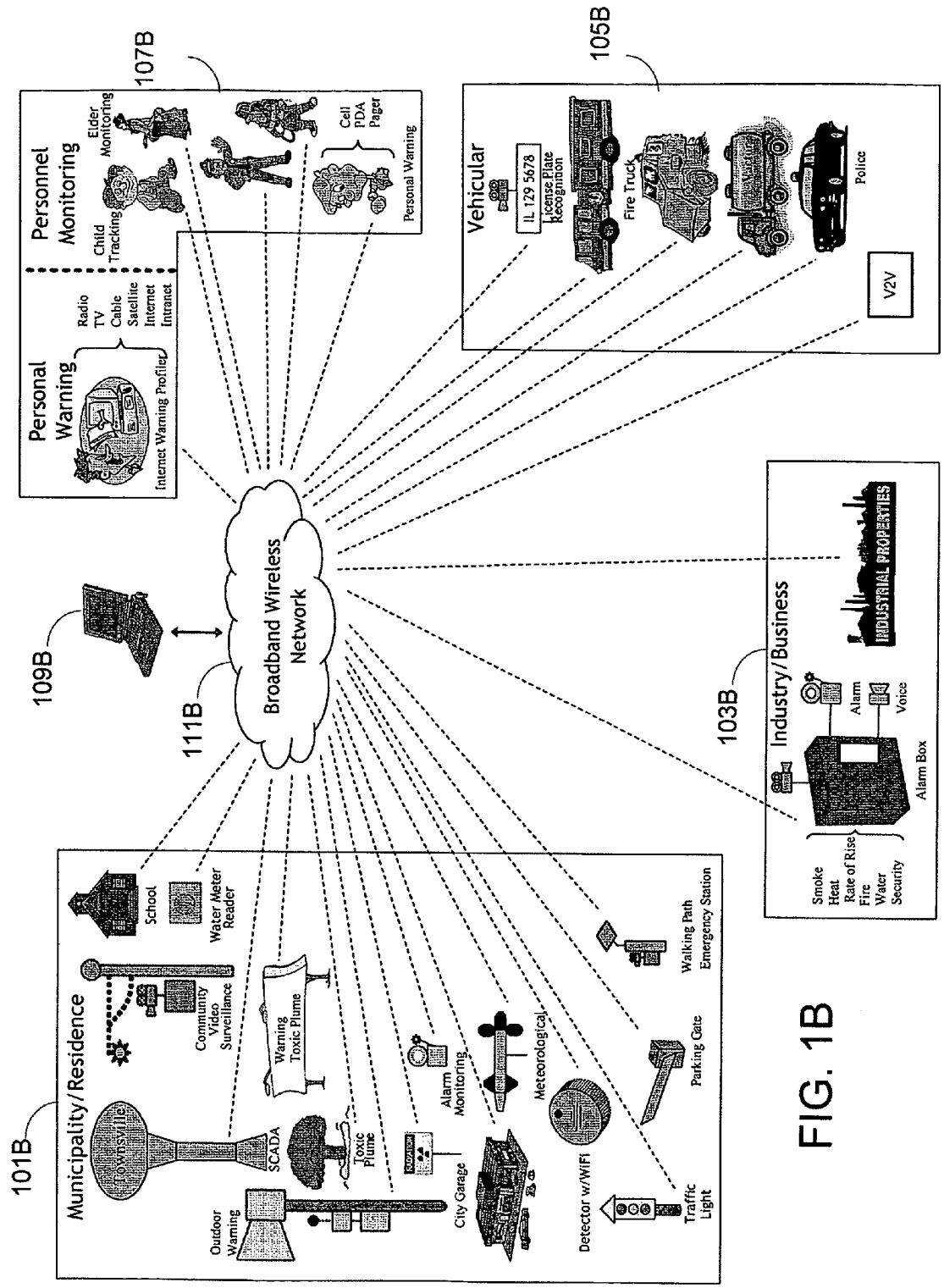
FIG. 1B is a schematic illustration showing the networked components and resources of FIG. 1A in greater detail.
Figure 2:
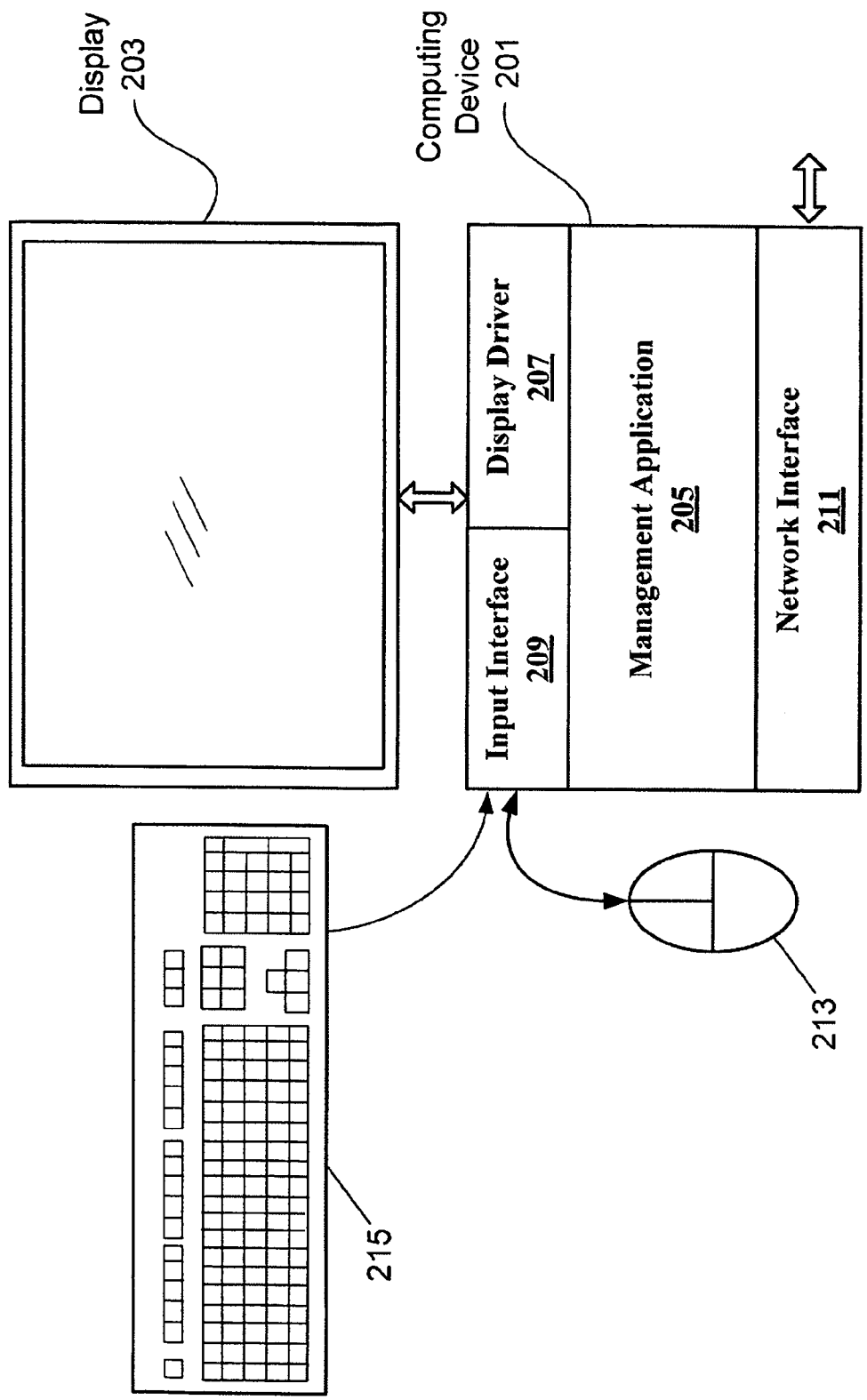
FIG. 2 is a schematic diagram of a management console computer for hosting the management console application and interface in embodiments of the invention.

FIG. 1B is a schematic illustration showing the networked components and resources of FIG. 1A in greater detail. As noted above, the types of data sources and resources typically exposed and accessed via the management console include data sources and resources related to municipal facilities and residential structures, industry and business infrastructure, vehicular resources and data sources, and personnel and citizen data sources and resources. Although these classes need not be rigorously defined, in an embodiment of the invention, municipal and residence facilities 101B include fresh water/ waste water control and data sources (supervisory control and data acquisition), community video surveillance control and data sources, outdoor warning devices such as sirens and bill boards, toxic event data sources (spills, plumes, radioactivity, etc.), municipal parking control and data sources, meteorological sensor data sources, residential and business detection data sources (e.g., smoke, fire, CO, heat, rate-of-rise, etc.) and alarm control, traffic signal data sources and control, and walking path surveillance and patrol. It can be seen that the foregoing data sources include many data sources having a plurality of different types. For example, the illustrated example embodies both meteorological sensors and parking sensors.

In an embodiment of the invention, the industry and business infrastructure 103B includes data sources and resources related to smoke, heat, rate of rise, fire, water, and security, including, for one or more of these areas, alarm data and control, sensor data, and voice data. Such elements may be consolidated via a centralized alarm system such as an alarm box system or otherwise or may be individually linked to the management console 109B. In addition, the industry and business infrastructure 103B includes industrial properties sensor data and control in an embodiment of the invention. The vehicular resources and data sources 105B include, in an embodiment of the invention, license plate recognition systems, fire department vehicular resources and data sources, municipal street cleaning resources and data sources, sewage cleaning and maintenance vehicle resources and data sources, police vehicle resources and data sources, ambulance vehicle resources and data sources, and vehicle-to-vehicle (V2V) systems. Finally, in an embodiment of the invention, the personnel and citizen data sources and resources 107B include child tracking data sources, first responder locations and data, elder monitoring data sources, and personal monitoring, such as via cell phones, personal heart monitors, PDAs, pagers, etc.

Moreover, in an embodiment of the invention, individual subscribers are able to configure their warning profiles via a warning profiler such as an Internet accessed warning profiling interface. In this embodiment of the invention, the management console application exposes an Internet interface that a user can log onto to configure the manner in which they wish to be warned and the events for which they wish to be warned. For example, a user can set their profile such that they get warned via their cell phone of all events occurring within a certain geographical area. For example, a person traveling away from home may nonetheless wish to receive event notifications regarding their home area if they have a family. Conversely, such a person may wish instead or additionally to receive notifications regarding the area to which they are traveling. Other nonexclusive examples of communications media via which a user can be warned include radio, TV, cable, satellite, Internet and intranet.

When entering or modifying their profile, the user is preferably requested to enter appropriate contact information. For example, if their profile specifies email warning, then they are prompted to provide an email address. If the user's profile includes a cell phone warning element, then they are prompted to specify a cell phone number. Although the warning profiler in the illustrated example is exposed to the user via the Internet, and although such a mechanism is convenient and easy to access, such an interface is not required. For example, a user could phone in their profile preferences or mail in a form to specify their profile preferences.

The operation of the management system including the management console will be discussed in greater detail hereinafter. However, in overview, the management console application assimilates input data from a variety of sensors and data sources and, based on that data, may take an action (e.g., set all traffic lights along a stretch of road to green for an emergency vehicle) and/or alert an operator of the management console (e.g., flash a warning light) and/or present that information to the operator (e.g., automatically open a screen that displays information related to the incoming data of interest). In an embodiment of the invention, the management console automatically executes a response strategy implemented via the available resources and alarms that are linked to the management console. Although it is not a requirement of the invention that each and every data source, sensor, alarm, and resource in the monitored area be exposed via the management console 109B, the effectiveness of the system will typically depend to some extent on the availability of adequate information and resources, as well as the profiles and associations established relative to the data sources and resources.

It will often be the case that the sensor data, alarm activation, and notifications will be strategically managed on a geographical basis, e.g., by receiving geographically locatable data and causing a geographically specific warning to be given. In a further embodiment of the invention, the management console is also used to track and manage the resources of surrounding areas during shortages of local resources. In this embodiment of the invention, the management consoles of each town or controlled region in a response range intercommunicate to update their resource status so that each management console knows what resources are available in the extended area should a severe crisis arise that requires resources beyond those immediately managed by a particular management console.

Much of the foregoing discussion related to the overall environment and generalized operation of the management console. The discussion hereinafter will focus primarily on the structure, processes, and operations of the management console. The management console application is typically implemented on a computing device 201 (the host device) such as a personal computer having a display 203 such as a flat screen or other type of display. The user interface features discussed herein are assumed to be implemented via the display 203, although another display such as on a PDA, cell phone, or tablet computer could be used instead or additionally. The host device 201 comprises a memory wherein a number of programmatic entities can be instantiated and from which such entities can execute and affect the operation of the device 201 in various ways as will be appreciated by those of skill in the art. It will be appreciated that the programmatic entities described interact with the external environment via appropriate hardware components of the device 201. For example, display functions utilize the display 203, networking functions utilize networking hardware on the device 201, and input activities rely on an interface between the device 201 and the input device. Such details are well-understood and will not be discussed at length herein.

The management console and system are implemented via a management application 205 running on the device 201. The management application 205 interfaces to the display 203 via an appropriate display driver 207. It will be appreciated that a user input device such as a mouse 213 and/or keyboard 215 is interfaced to the management application 205 via an appropriate input interface 209. It will be appreciated that other input technologies are suitable for use within embodiments of the invention. For example, touch screen input is especially suitable for user interaction with the management console (computing device 201), as at least part of the input facilities. As noted above, the management application 205 both sends and receives data via an appropriate network connection. To this end, the management application 205 interfaces via a network interface 211. This interface 211 allows the device 201 to send and receive data to and from network addresses on networks reachable directly or indirectly from the device 201.

It will be appreciated that the management application 205 will typically be embodied in the form of computer-readable instructions, data structures, program modules or other data stored on a computer-readable medium. Such computer-readable media can be any suitable media that can be accessed by the computing device 201, including volatile and nonvolatile media, removable and non-removable media, as well as storage media. Examples of storage media include RAM, ROM, EEPROM, flash memory, CD-ROM, and DVD.

As noted above, the management console assimilates input data from a variety of sensors and data sources and takes an action and/or alerts an operator and/or presents the relevant information to the operator. This arrangement allows for efficient recognition of and/or response to ongoing events or conditions of interest. Although the following description focuses on the manner in which the user interacts with the management console, in an embodiment of the invention, the user is not made aware of a remedial action taken. For example, some actions, such as low level actions related to traffic management, can be automatically taken pursuant to established associations without notifying the operator. Such actions can be effectively automated, and involving or notifying the operator for each such action would risk distracting the operator from more important issues that do require human interaction.

Figure 3:
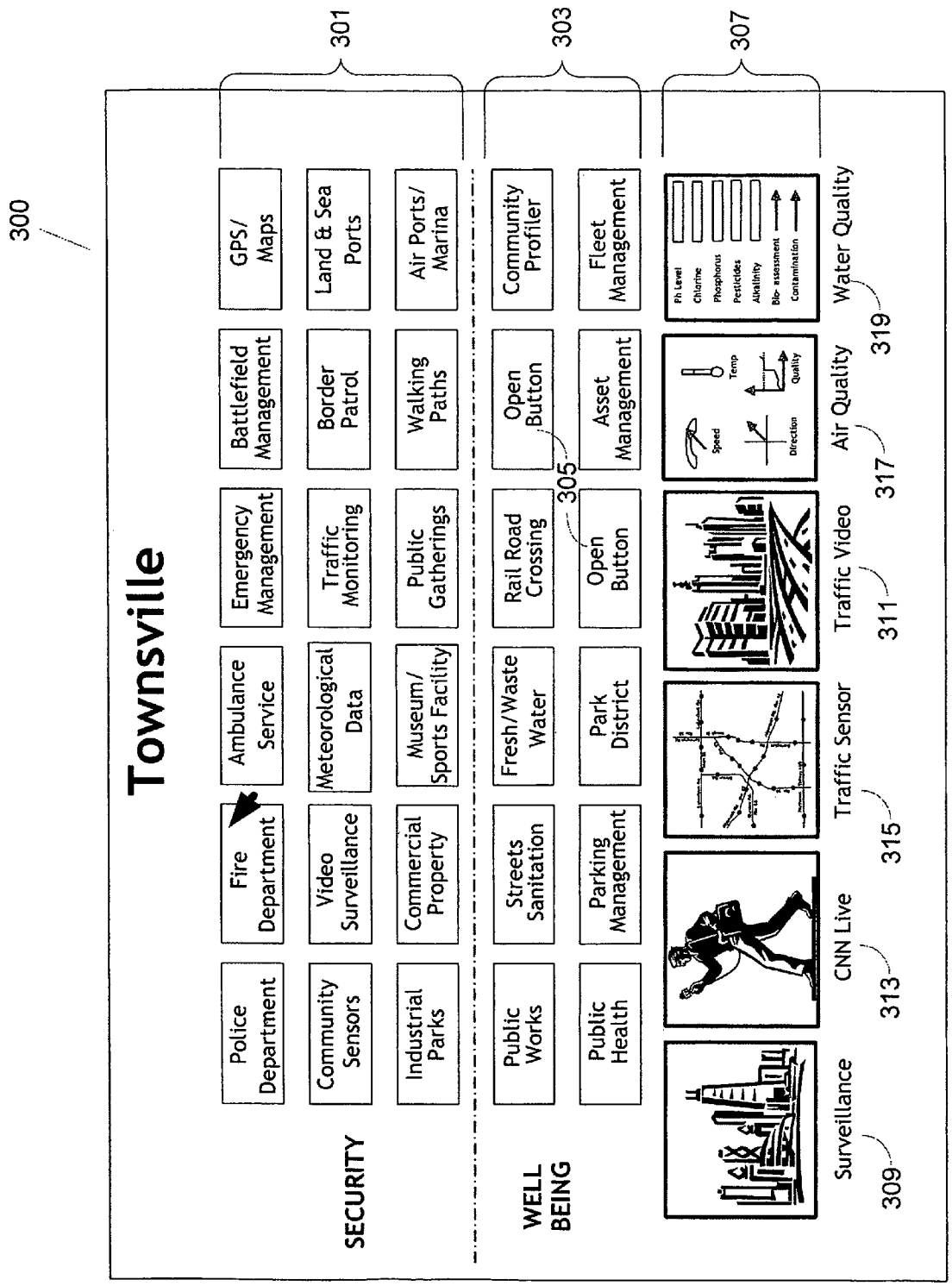
FIG. 3 is a diagram of an initial management console interface in an embodiment of the invention.

The exemplary interface illustrated in FIG. 3 shows the manner in which the management console interface is displayed to the user according to an embodiment of the invention. With respect to the user interfaces and interface elements described herein, in an embodiment of the invention, the interface and elements are generated and displayed via an executable application such as management console application 205. However, as noted herein, the communications links usable by the management console can include the Internet, and in an alternative embodiment of the invention the interaction with the management console is browser-based. In this embodiment of the invention, the custom elements of the system comprise data, HTML pages, and browser-based programmatic entities such as java applets, java servlets, and/or ActiveX® controls. The executable component responsible for the underlying functionality of the console application in this embodiment may be either a local application or a remote application linked to the client via a network connection.

The user interface 300, herein sometimes referred to as the management console interface, is displayed on the display device 203 by the management application 205. The management console interface 300 comprises a number of icons or fields that act as one or both of an information source and an activation icon. As examples, the exemplary management console interface 300 of FIG. 3 shows icons 301 for conveying information and allowing access to further information and actions regarding security. In the illustrated embodiment of the invention, these icons include elements for Police Department, Fire Department, Ambulance Service, Emergency Management, Battlefield Management, GPS/Maps, Community Sensors, Video Surveillance, Meteorological Data, Traffic Monitoring, Border Patrol, Land and Sea Ports, Industrial Parks, Commercial Property, Museum/Sports Facilities, Public Gatherings, Walking Paths, and Airports/Marina.

The exemplary management console interface 300 of FIG. 3 also displays icons 303 for conveying information and allowing access to further information and actions regarding general well being. In the illustrated embodiment of the invention, these icons include elements for Public Works, Streets and Sanitation, Fresh/Waste Water, Railroad Crossings, Community Profiler, Public Health, Parking Management, Park District, Asset Management, and Fleet Management. Note that not all spaces need be assigned, and in the illustrated embodiment example, two icons 305 remain "open" or unassigned.

As shown in the illustrated example, the management console interface 300 optionally provides a selection of visual (e.g., video and/or graphical) presentations 307. The presentations 307 typically serve a monitoring function, and in an embodiment of the invention are user-selectable so that a human operator can visually monitor different areas of interest. User selection may be, for example, via a right click of mouse 213 in the visual presentation field 307 and selection from a menu list of video sources. In an embodiment of the invention, either as a selected response pursuant to triggering of a defined strategy or as a separate action, the video feeds are automatically selected upon the occurrence of a predefined event to show the most relevant video for that event. For example, an alarm condition received from a monitored factory may cause a video feed from the vicinity of the factory to be displayed in field 307. In the illustrated example, the visual representations in field 307 include video 309, 311 from a surveillance camera and a traffic monitoring camera respectively, as well as television news feed 313, and computer-generated graphics based on traffic sensors 315, air quality sensors 317, and water quality sensors 319.

Figure 4:
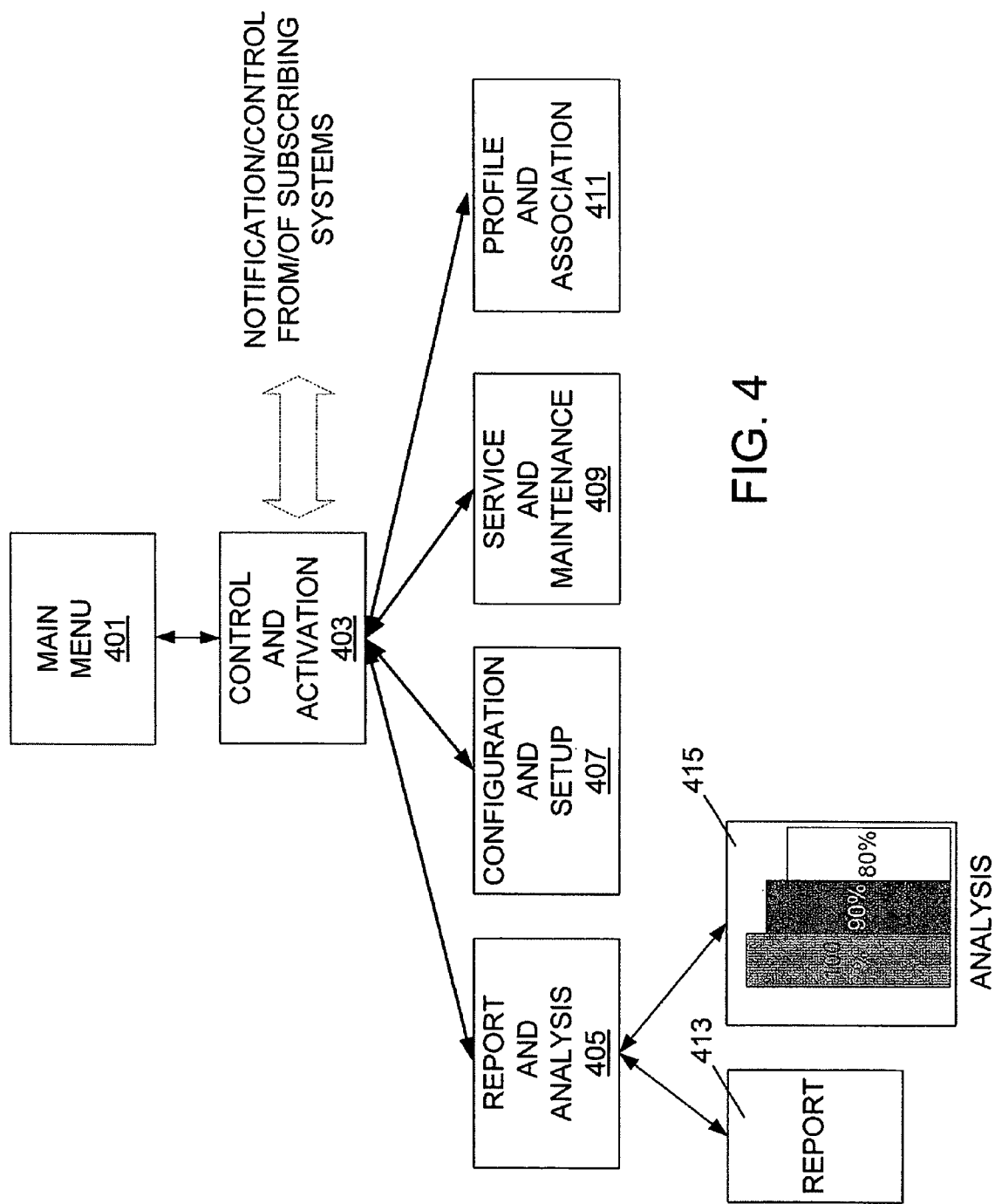
FIG. 4 is a hierarchy diagram showing user interface levels of the management console interface according to an embodiment of the invention.

In an embodiment of the invention, each icon in fields 301 and 303 is selectable within the management console interface 300, such as via a user selection by way of mouse 213, to obtain and/or display further information and/or take an action. Although the invention does not require any number of icons, number of layers of data, or indeed that each icon be selectable at all, an exemplary data hierarchy accessible via the icons 301, 303 is as shown in FIG. 4. The top layer of the hierarchy is the Main Menu 401, also illustrated in greater detail in FIG. 3. Selecting an icon within the Main Menu 401 invokes a second layer for the selected icon, the second layer being in the illustrated example a "control and activation" layer 403. The control and activation layer 403 provides an interface for the user to interact with data sources and resources linked to the associated icon. For example, if the icon selected in the main menu 401 is the "Traffic Monitoring" icon, the data sources exposed in the second layer 403 could comprise data feeds from a number of traffic monitors, and the exposed resources could include a tool for controlling one or more traffic lights.

It will be appreciated by those of skill in the art that there may be any number of screens in the management console interface and any number of routes between the screens, and that there is no restriction implied as to either characteristic by the present example. However, in this example the second layer 403 exposes a number of selectable icons leading to a plurality of third layer screens, including in the illustrated example a "report and analysis" screen 405, a "configuration and setup" screen 407, a "service and maintenance" screen 409, and a "profile and association" screen 411. Each of these types of screens will be discussed in greater detail with reference to FIGS. 5A-E. In an embodiment of the invention, one or more of the third layer screens 405-411 exposes an icon for selecting one or more fourth layer screens 413, 415.

Figure 5A:
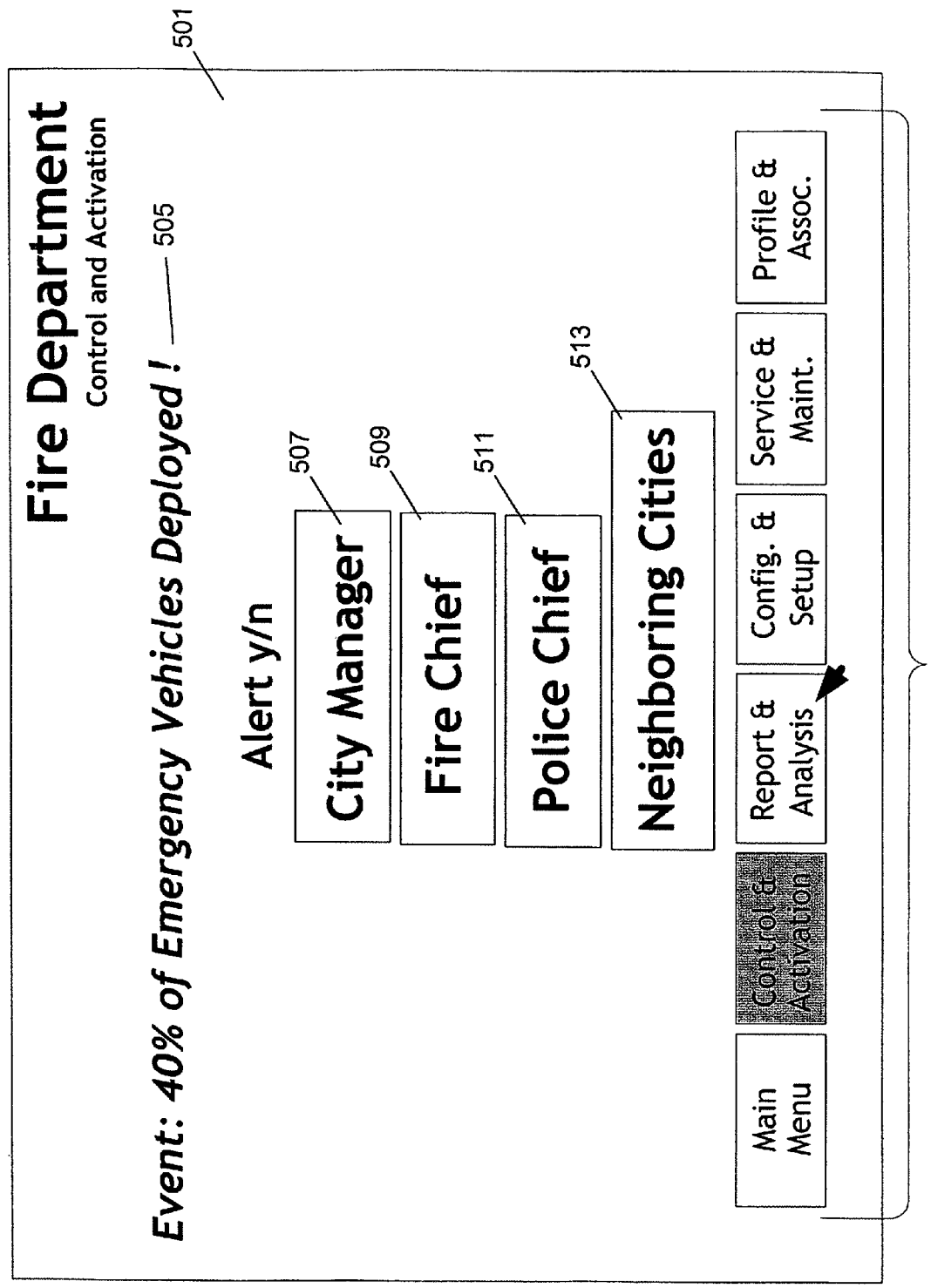
FIG. 5A is an exemplary representation of a control and activation interface of the management console according to an embodiment of the invention.

FIG. 5A illustrates the "control and activation" layer 501 (403) in greater detail. In this example, the user has selected the "Fire Department" icon in the main menu 300, leading to the display of the "control and activation" layer 501. Alternatively, the "control and activation" layer 501 can be automatically selected and displayed pursuant to an established association. The "control and activation" layer 501 comprises an event field 505 and one or more action fields 507-513. The event field 505 preferably contains information of importance relative to the selected icon, e.g., the Fire Department icon. In the embodiment of the invention wherein the icons 301, 303 of the main menu 300 exhibit a visual change to signal an alarm condition, the event field 505 preferably contains data related to the alarm condition. In the illustrated example, the data field 505 indicates "Event: 40% of Emergency Vehicles Deployed."

The action fields 507-513 can be configured to invoke any available action, but in the illustrated example they are configured to send a notification of the event to a selected party. There a number of ways that the action fields 507-513 can be configured. In a first embodiment of the invention, selection of the City Manager icon 507 causes a notification of the event to be sent to the city manager. Similarly, selection of the Fire Chief or Police Chief icons 509, 511 causes the named party to be notified. Selection of the "Neighboring Cities" icon 513 causes a notification to be sent to a pre-selected list of recipients in neighboring cities in an embodiment of the invention. In a second embodiment of the invention, selection of this icon 513 invokes a list of potential recipients, from which the user can choose desired recipients. In a third embodiment of the invention, notification will be automatically sent to the listed parties in fields 507-513 unless one or more fields are deselected (e.g., via a mouse click), in which case the deselected recipients will not be notified.

In the illustrated embodiment, the "control and activation" layer 501 also comprises a series of links 503 to the other screens available in the management console interface with respect to the "Fire Department" icon. The illustrated links include a link to the main menu 300 as well as links to "report and analysis," "configuration and setup," "service and maintenance," and "profile and association" screens which will be discussed in greater detail below.

Figure 5B:
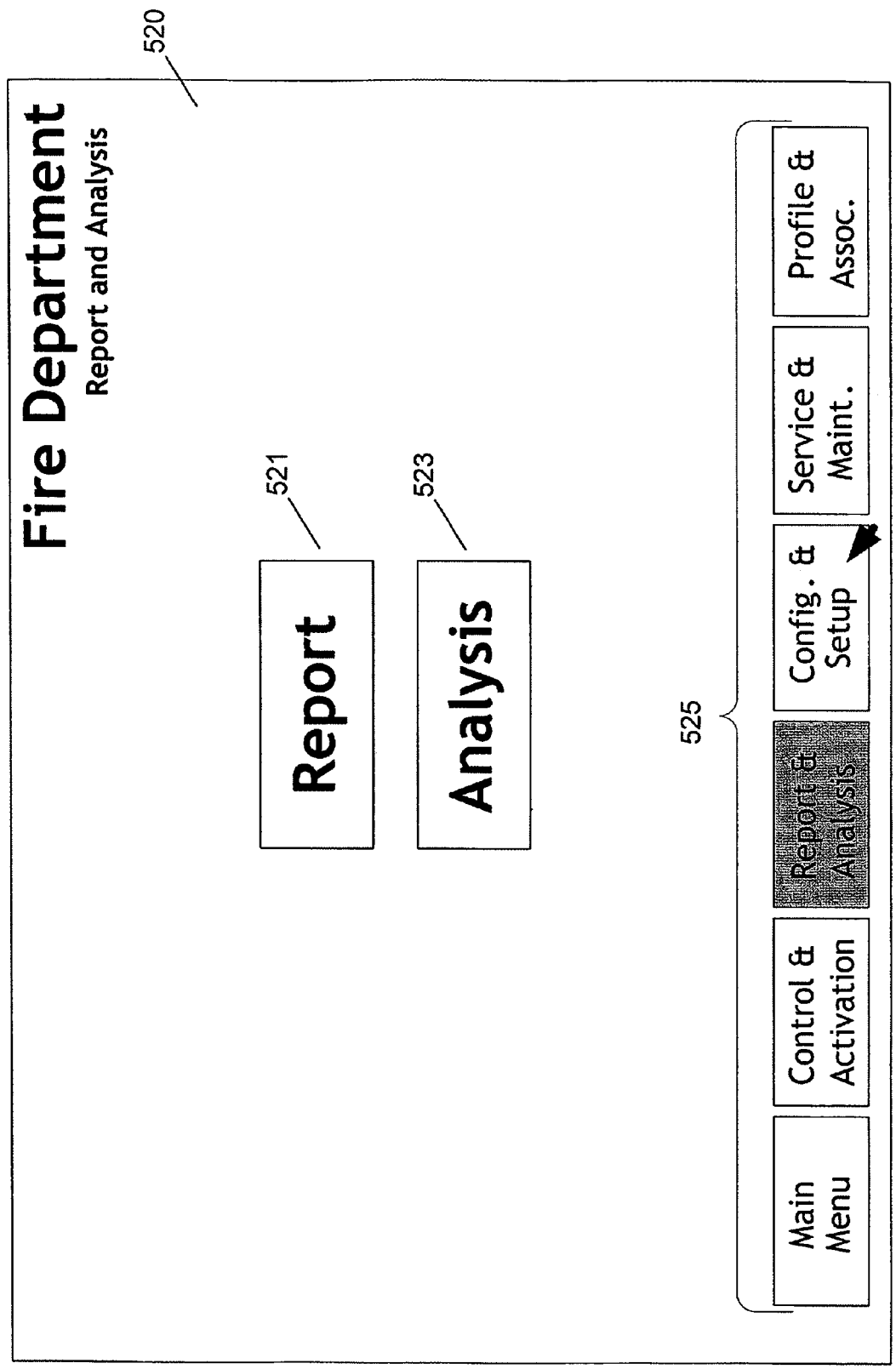
FIG. 5B is an exemplary representation of a report and analysis interface of the management console according to an embodiment of the invention.

Selection of the "report and analysis" link in field 503 invokes a third layer "report and analysis" screen 520 as illustrated in FIG. 5B. The illustrated "report and analysis" screen 520 comprises further links including a "report" link 521 and an "analysis" link 523. In an embodiment of the invention, the "report and analysis" screen 520 also comprises a series of links 525 to the other screens available in the management console interface with respect to the "Fire Department" icon. Selection of the "report" link 521 by the user invokes a report screen showing relevant data with respect to the subject matter of the selected icon. For example, the rendered report could comprise raw data such as the number of times a particular siren, or a group of sirens in a particular area, were activated within a specified time window. Selection of the "analysis" link 523 by the user invokes an analysis screen that conveys more detailed or additional data relative to that embodied in the report and/or a conclusion based on that or other data. Because of the connectivity and integration capability of the management console, the analysis may also incorporate data regarding resources and/or data sources other than those reflected in the report. For example, the report might convey data regarding local Fire Department resources and/or activities, but the management console can incorporate other data, such as data about past emergency usage of Fire Department resources from surrounding communities, into the analysis. The conveyed analysis may comprise a trend analysis, a statistical analysis, etc. to aid the user in determining a best course of action.

For example, if the report indicates that 70% of the local emergency vehicles are deployed, then there are only 30% remaining that are available in an emergency. If the analysis indicates that in the past this type of reserve has been insufficient (i.e., resulting in one or more past requests to other local governments for additional resources), then the present operator may wish to alert such other governments that a request for resources may be imminent, and/or may request a deployment status report of the resources of such other governments.

Figure 5C:
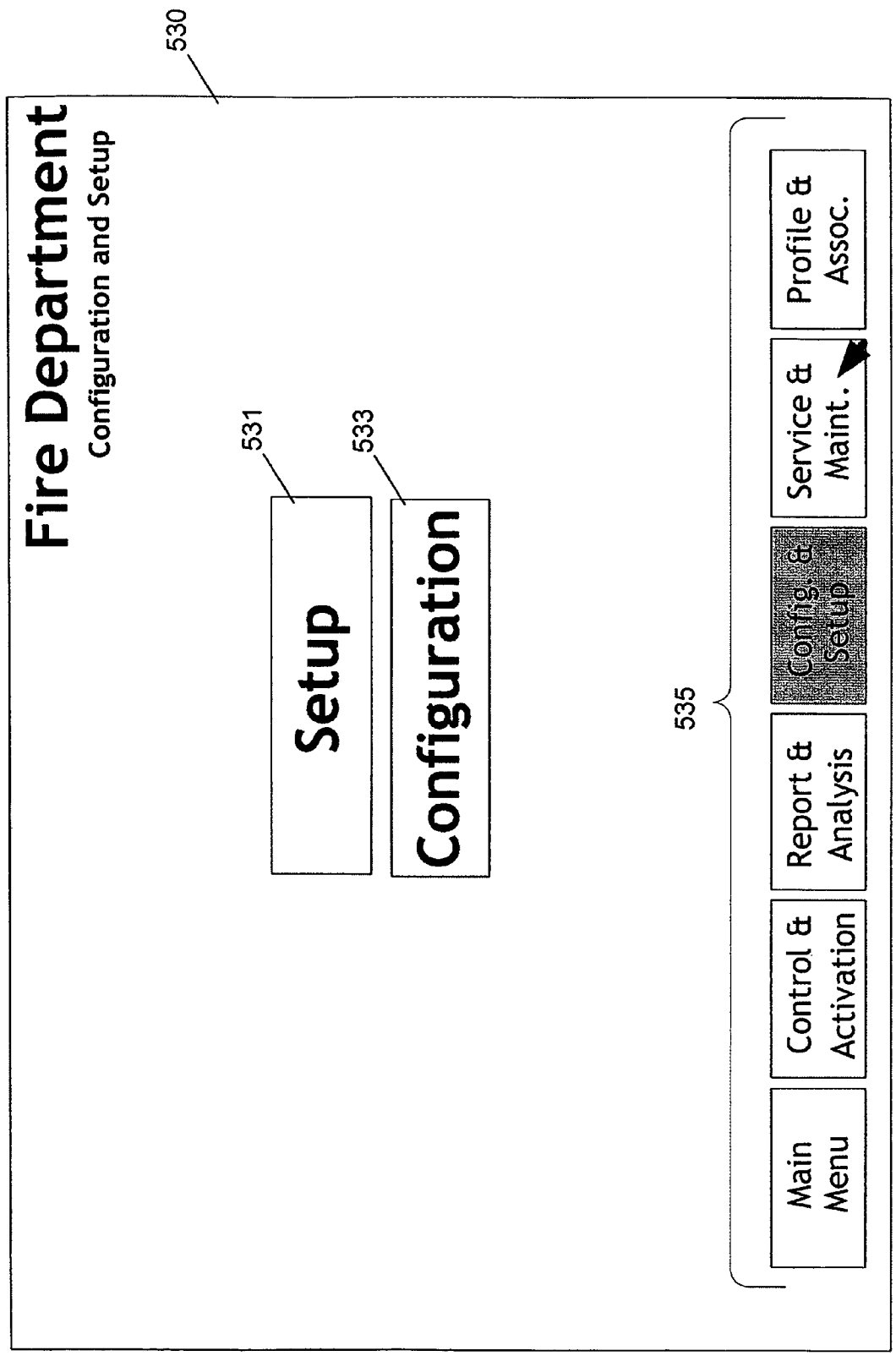
FIG. 5C is an exemplary representation of a configuration and setup interface of the management console according to an embodiment of the invention.

Referring again to FIG. 5A, if the operator selects the "Configuration and Setup" link in field 503, the management console invokes a third layer "configuration and setup" screen 530 as illustrated in FIG. 5C. The illustrated "configuration and setup" screen 530 comprises further links including a "setup" link 531 and a "configuration" link 533. In an embodiment of the invention, the "configuration and setup" screen 530 also comprises a series of links 535 to the other screens available in the management console interface with respect to the "Fire Department" icon.

User selection of the "setup" link 531 invokes a setup screen that allows the user to set the manner in which the associated device is exposed and operated. For example, the user may wish to format the Fire Department icon to include a selectable graphical representation of a fire truck. Selection of the "configuration" link 533 by the user invokes a configuration screen that allows the user to configure the manner in which the device is integrated with the management console. For example, the user may configure the management console to expect a certain type of data from the device, at a particular interval, and/or on a polled or event-driven basis.

Figure 5D:
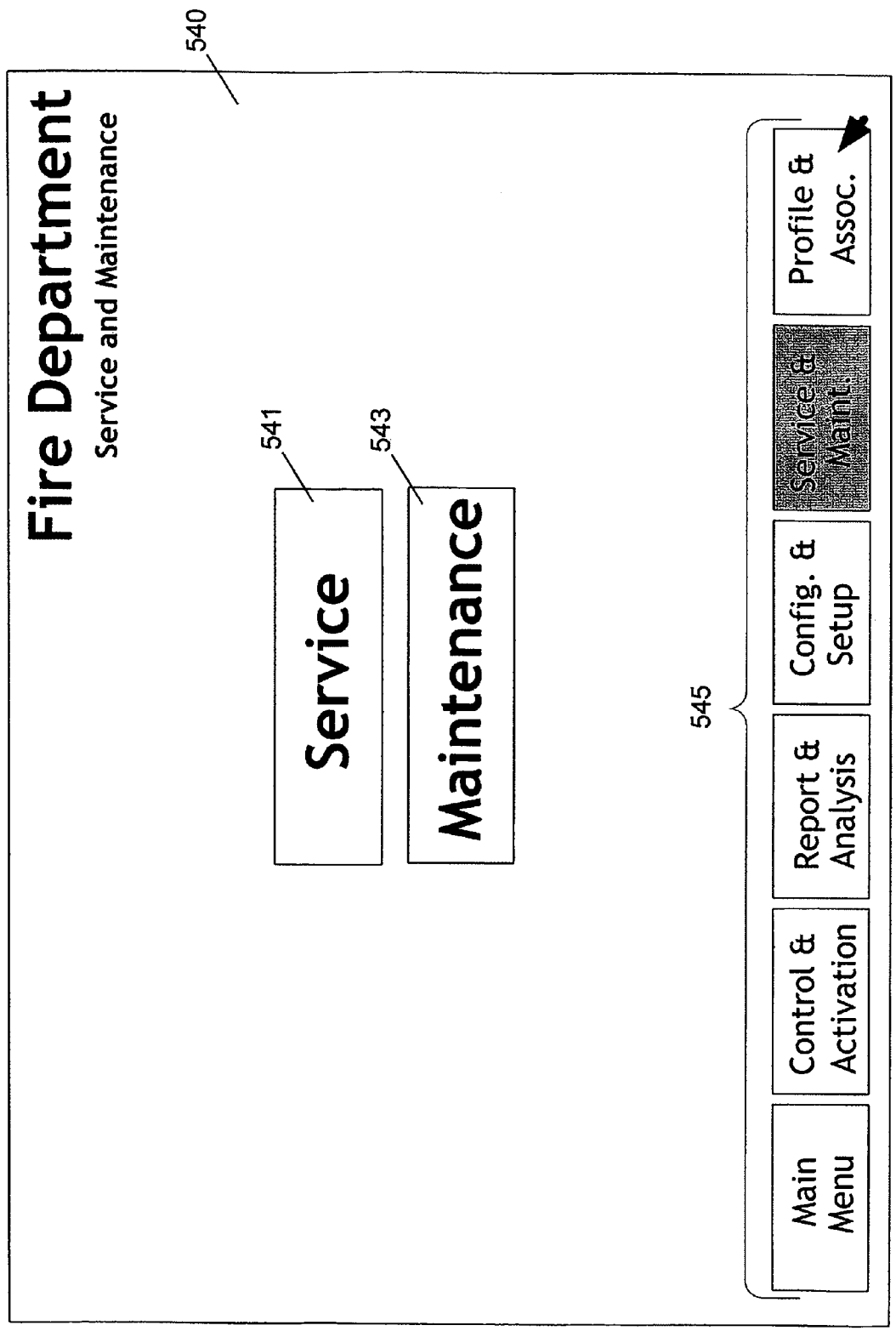
FIG. 5D is an exemplary representation of a service and maintenance interface of the management console according to an embodiment of the invention.

Again referring back to FIG. 5A, if the operator selects the "Service and Maintenance" link in field 503, the management console invokes a third layer "service and maintenance" screen 540 as illustrated in FIG. 5D. The illustrated "service and maintenance" screen 540 comprises further links including a "service" link 541 and a "maintenance" link 543. In an embodiment of the invention, the "service and maintenance" screen 540 also comprises a series of links 545 to the other screens available in the management console interface with respect to the "Fire Department" icon.

User selection of the "service" link 541 invokes a service screen that allows the user to invoke service actions with respect to the icon that was selected. For example, the user may wish to trouble-shoot a connection to a non-responding data source. As another example, the user may wish to periodically check system connectivity by pinging all known intercommunicating devices attached to the system. Selection of the "maintenance" link 543 by the user invokes a maintenance screen that allows the user to invoke service actions with respect to the icon that was selected, e.g., the fire department. For example, in an embodiment of the invention, the maintenance screen allows the user to upload new software to one or more networked devices, change device sensitivity on one or more networked devices, change the communication channel for one or more networked devices, etc. These examples are not intended to imply any limitation as to the number or nature of service and/or maintenance actions that may be exposed to the user.

Figure 5E:
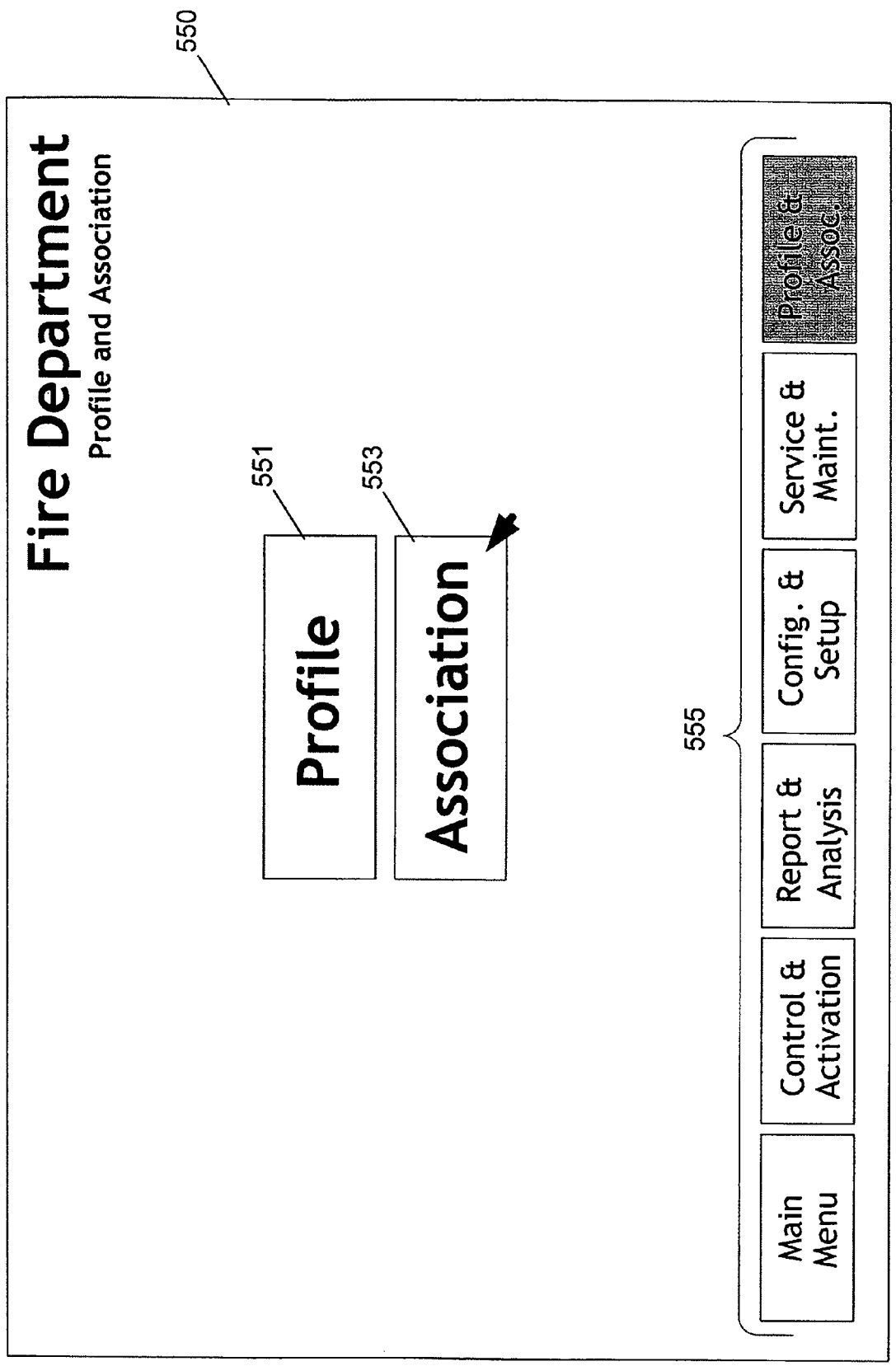
FIG. 5E is an exemplary representation of a profile and association interface of the management console according to an embodiment of the invention.

Referring once more to FIG. 5A, if the operator selects the "Profile and Association" link in field 503, the management console invokes a third layer "profile and association" screen 550 as illustrated in FIG. 5E. The illustrated "profile and association" screen 550 comprises further links including a "profile" link 551 and an "association" link 553. In an embodiment of the invention, the "profile and association" screen 550 also comprises a series of links 555 to the other screens available in the management console interface with respect to the "Fire Department" icon.

User selection of the "profile" link 551 invokes a profile screen that allows the user to view and modify profile information with respect to the data sources associated with the icon that was selected. A device profile in an embodiment of the invention specifies the IP or other address of the device, the manner in which the device communicates, and the type of data provided by the device, so that the management console can communicate with the device and properly interpret the resulting data. For example, a profile may specify that the device at IP address "69.139.13.239" is a traffic signal, and that the device exposes a data value that specifies the current state of the signal, e.g., what color it is and when it will change color. The profile may further specify that the device exposes a control value usable to set the current state of the signal. The profile can specify that the device requires a coded input of a certain type and/or an authorization code.

Selection of the "association" link 553 by the user invokes an association screen that allows the user to create associations between data from networked data sources and actions to be invoked relative to networked resources and/or relative to the user interface of the management console. For example, the user may wish to specify that when 40% of the fire department vehicles are deployed, the fire department icon in the security field 301 of FIG. 3 flashes or changes color, or the fire department "control and activation" screen 501 is automatically opened. The user could further specify, for example, that when 60% of the fire department vehicles are deployed, a request to have additional resources on stand-by is automatically sent to one or more nearby cities or municipalities. As another example mentioned above, the association may specify that when input data indicates that an emergency vehicle is with 500 feet of an intersection and heading toward the intersection, the traffic signals of the intersection are controlled so as to give the emergency vehicle a green light through the intersection.

Figure 6:
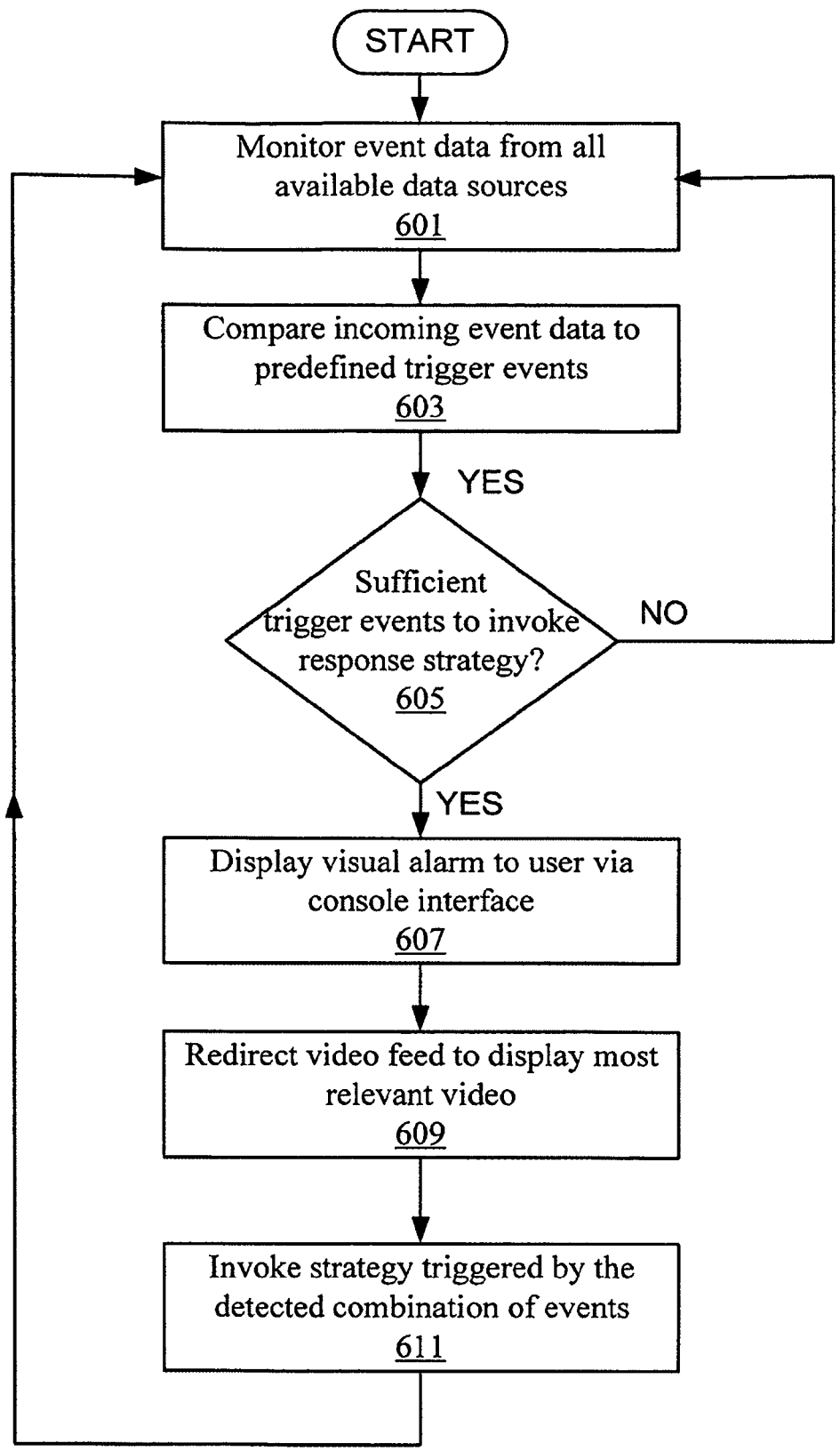
FIG. 6 is a flow chart illustrating an exemplary process of resource and data management executed by the management console application according to embodiments of the invention.

The operation of the management console is illustrated in flow chart form in FIG. 6. In general terms, the management console application monitors incoming event data from all available data sources as shown in step 601. Typically, the data arrives via a push configuration rather than being polled by the management console application, but in an embodiment of the invention, all or some data is gathered by polling.

Figure 7A:
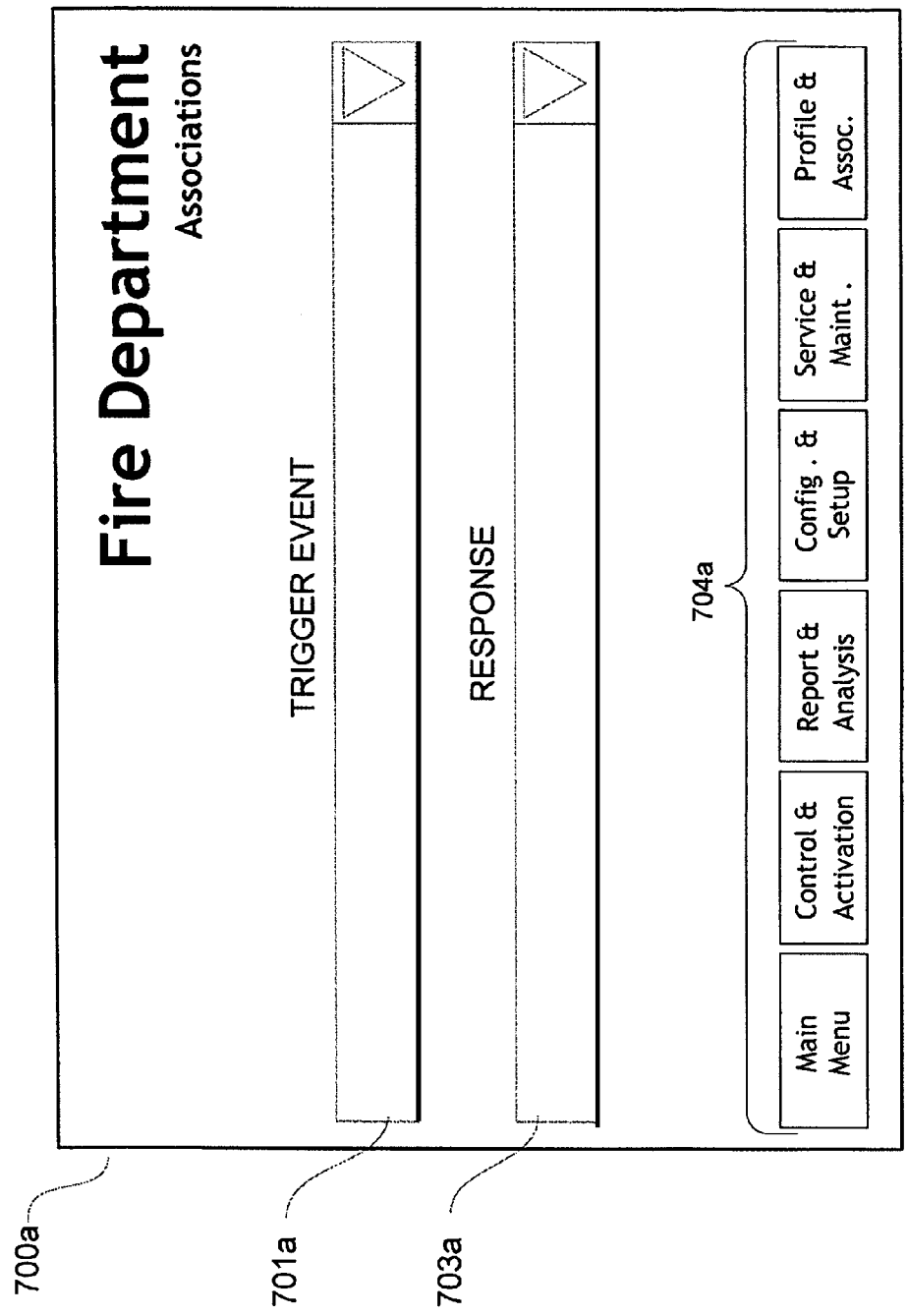
FIG. 7A is an exemplary representation of a user interface according to an embodiment of the invention for defining strategies usable by the management console application.

At step 603, the management console application 205 compares the incoming event data to a list of predefined trigger events. In an embodiment of the invention, the trigger events are user defined as described with respect to FIGS. 7A-C. In an alternative embodiment of the invention, trigger events are specified by the manufacturer, installer, or administrator instead of, or in addition to, the user-defined triggers. The management console application 205 determines at step 605 whether data has been received indicating the occurrence of one or more trigger events sufficient to invoke a response strategy. For example, if a particular response strategy is to be triggered when Event A happens and Event B does not happen, then upon receiving notification of the occurrence of Event A, the management console application 205 determines whether Event B has not happened.

If it is determined at step 605 that there is not a combination of events sufficient to invoke a response strategy, the process returns to step 601 without taking other action. Otherwise, the process invokes the strategy associated with the detected combination of events. Thus at step 607, in an embodiment of the invention, the management console application 205 takes an action such as displaying a visual alarm to the user via the management console main interface 300, e.g., by blinking or recoloring one of the icons. In an embodiment of the invention, the management console application 205 may also sound an audible alarm, page the user, send an email and/or otherwise raise a noticeable alarm.

At step 609, in an embodiment of the invention, the management console application 205 redirects the video feed, selecting the most relevant video to display. At step 611, the management console application 205 invokes the strategy that is triggered by the detected combination of events. This would typically entail activating the necessary alarms and giving specified notifications and/or taking specified actions. Typically, the alarms to activate and the notification and/or actions to perform will be predefined by the strategy definition.

An example user interface according to an embodiment of the invention for defining associations is described hereinafter, although it will be appreciated that the illustrated interface is merely an example and that other types of interfaces may be used instead. In an embodiment of the invention, the interface 700a initially comprises a pair of drop-down menus 701a, 703a, for selecting trigger events and associated responses from respective lists of selectable options. The interface 700a also comprises a series of links 704a to the higher level screens available in the management console interface with respect to the icon of interest, e.g., the "Fire Department" icon.

Figure 7B:
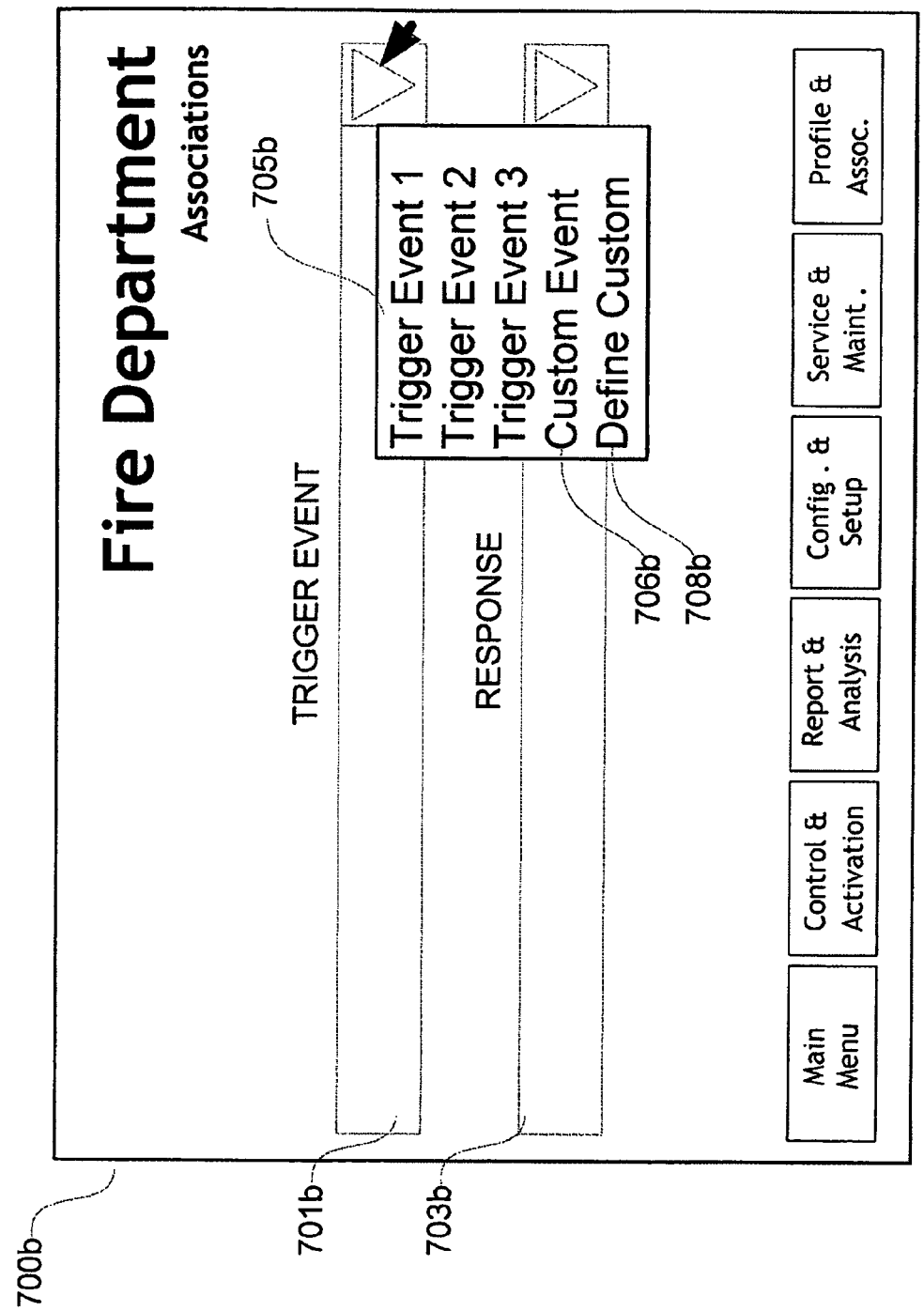
FIG. 7B is an exemplary representation of a further user interface according to an embodiment of the invention for defining strategies usable by the management console application.
Figure 7C:
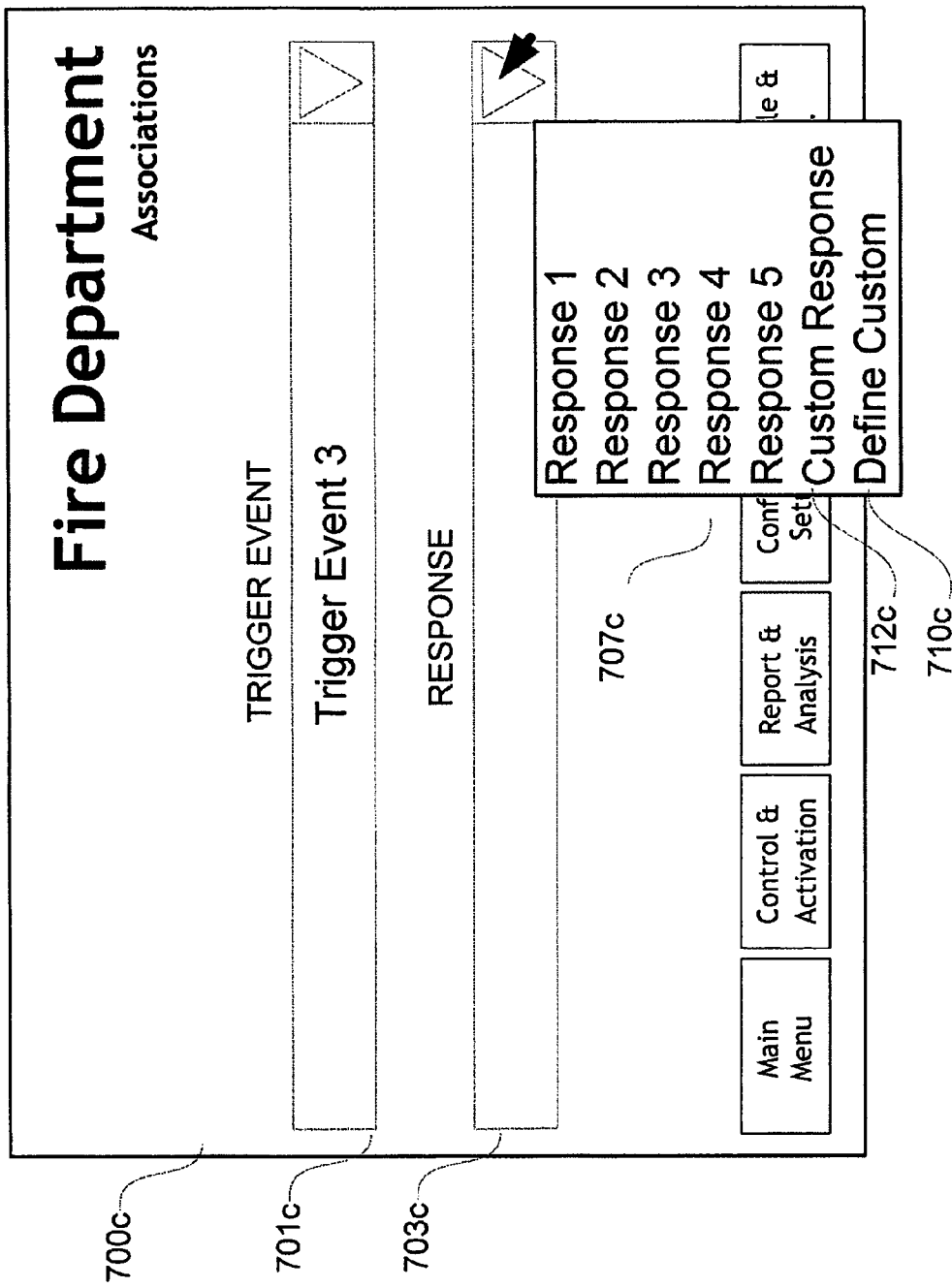
FIG. 7C is an exemplary representation of a further user interface according to an embodiment of the invention for defining strategies usable by the management console application.

Once the user invokes the drop-down menu 701a, 701b of trigger events as shown in FIG. 7B, a list 705b of selectable trigger options is displayed. Although the illustrated example lists the options generically, these options would typically be the major events known to require response. For example, a trigger could be "wind speed exceeds 80 MPH." It will be appreciated that a greater or smaller number of trigger options may be presented in the list 705b depending upon the types of devices in the monitored area and the user's preferences. In a further embodiment of the invention, a selectable "define custom" trigger option 708b is presented in the list 705b. Selection of this option allows the user to define a trigger event other than those already listed in the list 705b. Another selectable option "custom event" relates to a custom event previously defined by the user. Once the user has selected or defined a trigger event, that trigger event in reflected in the trigger event field 701c.

After selection of a trigger event, the user selects an appropriate response to the occurrence of that event. As with the trigger event field, the user activates a drop-down menu 707c of response options. In a further embodiment of the invention, the list of response options 707c includes a "define custom" response option 710c that when selected allows the user to define a response other than those listed in the drop-down menu 707c of response options. A further option 712c allows the user to select a custom response previously defined by the user.

Figure 8:
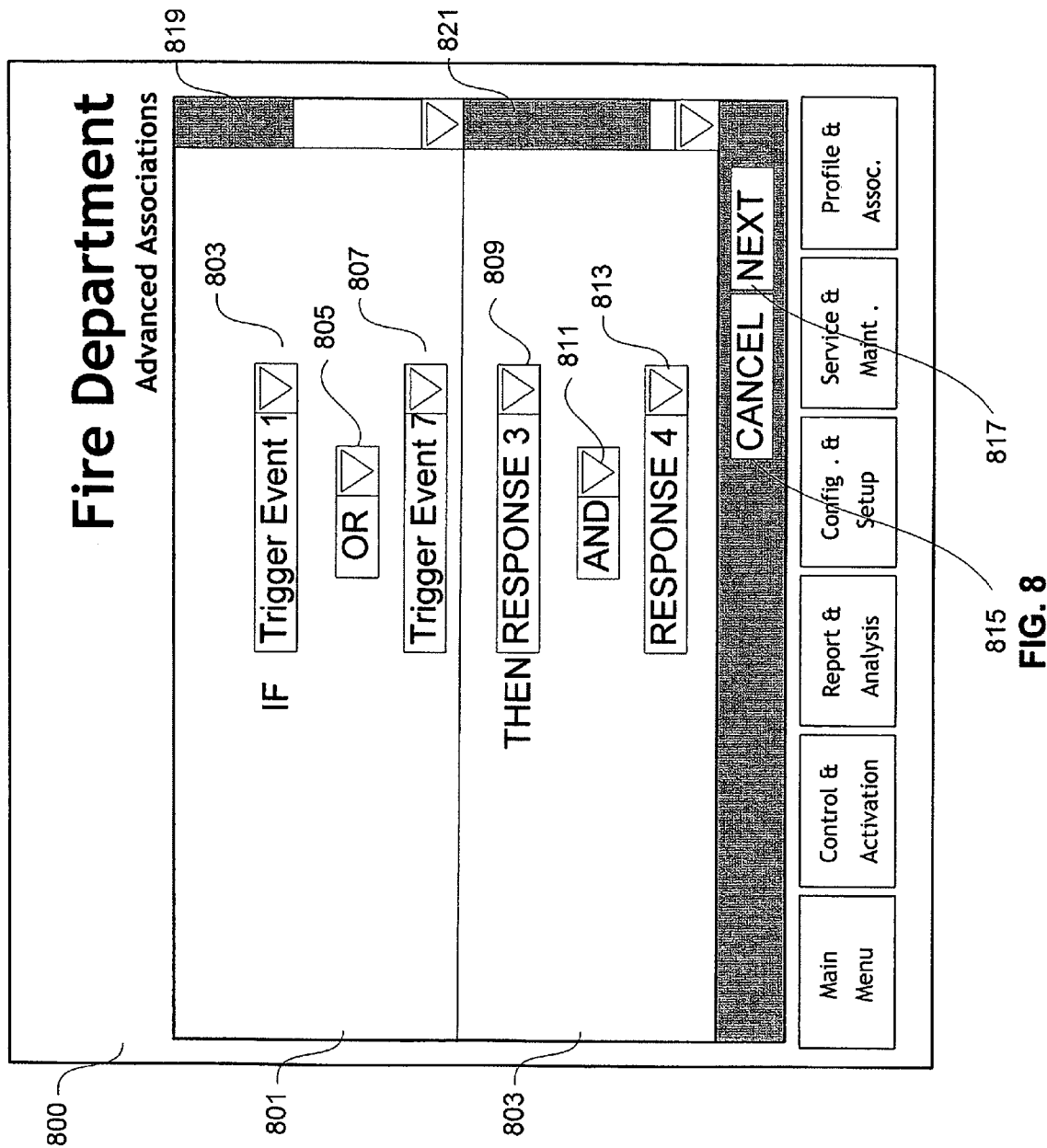
FIG. 8 is an exemplary representation of an alternative interface according to an embodiment of the invention for defining strategies usable by the management console application.

In addition to the trigger event and response selection mechanism described above, the management console interface presents an advanced strategy creation interface in an embodiment of the invention. As shown in FIG. 8, the advanced strategy interface 800 comprises a Boolean trigger definition field 801 and a Boolean response definition field 803. Within the Boolean trigger definition field 801 are trigger definition drop-down menus 803, 807, as well as a Boolean operator field 805 to define the manner in which selected triggers are to be combined. Similarly, the Boolean response definition field 803 comprises response definition drop-down menus 809, 813, as well as a Boolean operator field 811 to define the manner in which selected responses are to be combined. The Boolean operators exposed by fields 805, 811 comprise AND, OR, ANDNOT, and XOR in an embodiment of the invention, but the exact operators exposed are not critical and will depend upon the manufacturer's preferences.

It will be appreciated that the trigger definition field 801 may contain more than the illustrated two trigger definition fields and the response definition field 803 may contain more than the illustrated two response definition fields. In an embodiment of the invention, slider bars 819, 821 are provided to allow access to further definition options.

Once the user has finished defining triggers and associated responses, they can select one of two options. In particular, the illustrated interface 800 exposes a selectable cancellation option 815, and a selectable "next" icon 817. Selecting the cancellation option 815 will cause the strategy definition interface 800 to close. In an embodiment of the invention, closure of the strategy definition interface 800 is preceded by a warning that all definitions not saved will be lost. Selection of the "next" icon 817 presents additional definition opportunities in an embodiment of the invention. In an alternative embodiment of the invention, the icon 817 is instead a "done" icon, selectable to signal completion of the strategy definition.

Although the illustrated example shows four levels of layered interfaces, this will typically vary depending upon the underlying information and/or resources as well as the administrator's preferences; the level of nesting required can be very little or very high based on the level of granularity required by the information and resources linked to the initial icon. Furthermore, in various embodiments of the invention, icons may expose solely information at all or some levels, or a combination of information and activation options.

Although in the foregoing examples the management console provides information and allows for the execution of certain actions and notifications with respect to external devices and resources, the foregoing examples do not expressly describe resource deployment as part of the management console operation. However, in a further embodiment of the invention, the management console provides a link to allow actual resource deployment. This may be either via the interface described above or an accompanying interface such as on another screen and/or computer. This type of operation is especially desirable in an incident command center scenario wherein centralized data processing and personnel/resource control are needed for purposes coordinating a timely response to ongoing events. It will be appreciated that deployment of resources may involve a direct link from the management console to the resources of interest, or may involve the use of an existing computer aided dispatch (CAD) system.

An example of this type of operation is the automatic or manual deployment via the management console of personnel, such as law enforcement personnel, based on incoming sensor data. Thus, an association may specify that when a hazardous chemical is detected, a hazardous materials crew and police personnel are automatically dispatched to the appropriate location.

In an embodiment of the invention, the resources exposed via the management console include a number of addressable wireless warning elements such as sirens and/or alarms. In a further embodiment of the invention, the addressable wireless warning elements include community sirens. In yet a further embodiment of the invention, one or more such community sirens comprise preexisting sirens that are modified to include a wireless router in order to better integrate with the management console.

It will be appreciated that a new and useful system and architecture for municipal resource management have been described herein with respect to several embodiments of the invention, including the best mode known to the inventors for carrying out the invention. Variations of these preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. As noted earlier, all references to "the invention" are intended to reference the particular embodiment(s) of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

All references, including publications, patent applications, and patents, cited herein are hereby incorporated by reference to the same extent as if each reference were individually and specifically indicated to be incorporated by reference and were set forth in its entirety herein.

I claim:

1. A method for managing one or more resources providing alerting and first responder services to a community of people and one or more data sources distributed for reporting public safety conditions in the community, the method comprising:
   monitoring public safety conditions of the community at a management console;
   recognizing anomalies in data received from the one or more data sources,
   visualizing at the management console the recognition of the anomalies and a causal relationship between each of the anomalies and one or more of the resources providing alerting and first responder services to the community;
   providing information regarding each of the anomalies to at least the resources identified by the causal relationship;
   managing at the management console the causal relationships between the anomalies and the resources providing alerting and first responder services so as to marshal appropriate resources in response to recognition of one of the anomalies; and
   visualizing at the management console the marshalling of the appropriate resources.

2. The method according to claim 1, wherein the data sources and the one or more resources are linked to the management console.

3. The method according to claim 2, wherein the data sources and the resources are linked to the management console via a network and are addressable by the management console over the network.

4. The method according to claim 3, wherein the network comprises a plurality of types of networking media.

5. The method according to claim 4, wherein the plurality of types of networking media comprise one or more types selected from the group consisting of wireless, wired, broadband, LAN, Internet, and PSTN.

6. The method according to claim 2, wherein the management console comprises a user interface displaying a plurality of icons associated with respective ones of the data sources and resources, the method further comprising modifying at least one of the icons in response to receiving anomalies in the data from one or more of the data sources.

7. The method of claim 1, wherein monitoring the data sources comprises polling at least one of the data sources.

8. The method of claim 1, wherein monitoring the data sources comprises awaiting a transmission from at least one of the data sources.

9. The method of claim 1, wherein the resources comprise a plurality of sirens modified to include a wireless router to communicate with the management console over a network link that is at least partly wireless.

10. The method of claim 1, wherein the anomalies relate to a plurality of types of data sources.

11. The method of claim 1, wherein the alerting and first responder resources include dispatching resources selected from a group consisting of personnel and vehicles.

12. The method of claim 1, wherein at least one of the alerting and first responder resources include a personnel notification system.

13. The method of claim 12, wherein the personnel notification system comprises a siren.

14. A management interface for managing first responder and alerting resources serving a community of people, where the resources are responsive to data received from data sources distributed about the community for detecting public safety conditions, the interface comprising:
   a first interface containing a plurality of icons, each icon representing one of the first responder and alerting resources and the data sources for detecting public safety conditions, and
   a second interface becoming available for user interaction upon selection of one of the icons in the first interface, wherein the second interface exposes information regarding a causal relationship between one of the first responder and alerting resources and one of the data source for detecting public safety conditions and exposes a mechanism for managing the causal relationship in order to marshal first responder and alerting resources for responding to exceptions to normal public safety conditions determined from the data received from the data sources.

15. The management interface of claim 14, wherein the first and second interfaces are computer-displayed interfaces, and the first and second interfaces are different computer-generated screens.

16. The management interface of claim 15, wherein the second interface is made visible automatically upon the receipt of data from at least one of the one or more data sources.

17. The management interface of claim 14, wherein the first and second interfaces are presented via a touch screen.

18. The management interface of claim 17, wherein the second interface is made visible by user-selection of one of the icons of the first interface.

19. The management interface of claim 14, wherein the first interface comprises a graphics field for displaying one or more sets of data in one or more respective visual formats.

20. The management interface of claim 19, wherein the one or more respective visual formats are selected from the group consisting of a video format and a graphical format.

21. The management interface of claim 19, wherein at least one of the sets of data displayed in the graphics field is selected based upon data from at least one of the data sources.

22. The management interface of claim 14, wherein the mechanism for managing at least one of the one or more resources comprises a third interface for defining an association between a set of at least one criteria regarding data received from one or more of the data sources and a set of at least one action to be taken if the data matches the set of at least one criteria.

23. The management interface of claim 14, wherein the mechanism for managing at least one of the one or more resources is a selectable link for accessing a third interface for defining an association between a set of at least one criteria regarding data received from one or more of the data sources and a set of at least one action to be taken if the data matches the set of at least one criteria.

24. The management interface of claim 14, wherein the mechanism for managing at least one of the one or more resources is a selectable icon for causing an action to be taken with respect to at least one of the resources.

25. The management interface of claim 14, wherein managing at least one of the one or more resources comprises sending a notification, activating an alarm, and modifying the state of a resource.

26. The management interface of claim 14, wherein the first and second interfaces are hosted by an Internet browser.

27. A computer-readable medium having thereon computer-readable instructions for presenting a management interface for managing first responder and alerting resources serving a community of people, where the resources are responsive to data received from one or more of a plurality of different types of data sources for detecting public safety conditions in the community, the computer readable instructions comprising instructions for:

displaying a first interface containing a plurality of icons, each icon representing one or more of the first responder and alerting resources and data sources for detecting public safety conditions;

displaying at least one second interface upon selection of one of the icons of the first interface, wherein the at least one second interface exposes information regarding a causal relationship between one of the data sources for detecting public safety conditions and one of the first responder and alerting resources, which causal relationship enables first responders and alerting resources to react to abnormal conditions in the community; and displaying a third interface for managing the causal relationship between the first responder and alerting resources and data sources for detecting public safety conditions.

28. The computer-readable medium of claim 27, wherein the first, second, and third interfaces are different computer-generated screens.

29. The computer-readable medium of claim 28, wherein the first, second, and third interfaces are presented via a touch screen.

30. The computer-readable medium of claim 28, wherein the second interface is made visible automatically upon the receipt of data from at least one of the one or more data sources.

31. The computer-readable medium of claim 28, wherein the second interface is made visible by user-selection of one of the icons of the first interface.

32. The computer-readable medium of claim 28, wherein the third interface is made visible by user-selection of a selectable element in the second interface.

33. The computer-readable medium of claim 27, wherein the first interface comprises a graphics field for displaying one or more sets of data in one or more respective visual formats selected from the group consisting of a video format and a graphical format.

34. The computer-readable medium of claim 33, wherein at least one of the sets of data displayed in the graphics field is selected based upon data from at least one of the data sources.

35. The computer-readable medium of claim 27, wherein the third interface presents user-selectable options for defining an association between a set of at least one criteria regarding data received from one or more of the data sources and a set of at least one action to be taken by one or more of the resources if the data matches the set of at least one criteria.

36. The computer-readable medium of claim 27, wherein the third interface comprises a selectable icon for causing an action to be taken with respect to at least one of the resources.

37. The computer-readable medium of claim 27, wherein managing at least one of the one or more resources comprises sending a notification, activating an alarm, and modifying the state of a resource.

38. The computer-readable medium of claim 27, wherein the first, second, and third interfaces are hosted by an Internet browser.

* * * * *